United States Patent
Franke et al.

(10) Patent No.: US 12,453,312 B2
(45) Date of Patent: Oct. 28, 2025

(54) AGRICULTURAL HEADER WITH INTER-BELT CROP DIVIDER

(71) Applicant: DEERE & COMPANY, Moline, IL (US)

(72) Inventors: Derek J. Franke, Davenport, IA (US);
Matthew R. White, Geneseo, IL (US);
Kelli L. Martin, Morton, IL (US);
Nicholas J. Keener, Geneseo, IL (US)

(73) Assignee: Deere & Company, Moline, IL (US)

( * ) Notice: Subject to any disclaimer, the term of this patent is extended or adjusted under 35 U.S.C. 154(b) by 790 days.

(21) Appl. No.: 17/550,142

(22) Filed: Dec. 14, 2021

(65) Prior Publication Data
US 2022/0400615 A1    Dec. 22, 2022

Related U.S. Application Data

(60) Provisional application No. 63/211,255, filed on Jun. 16, 2021.

(51) Int. Cl.
*A01D 61/02* (2006.01)
*A01D 34/04* (2006.01)
(Continued)

(52) U.S. Cl.
CPC .............. *A01D 61/02* (2013.01); *A01D 57/20* (2013.01); *A01D 61/002* (2013.01);
(Continued)

(58) Field of Classification Search
CPC .... A01D 61/02; A01D 61/002; A01D 61/008; A01D 57/20; A01D 34/04; A01D 34/14; A01D 41/14
See application file for complete search history.

(56) References Cited

U.S. PATENT DOCUMENTS

| 5,464,371 A | 11/1995 | Honey |
| 6,202,397 B1 * | 3/2001 | Watts .................. A01D 61/002 56/208 |

(Continued)

FOREIGN PATENT DOCUMENTS

| DE | 2143532 A1 * | 3/1972 |
| DE | 2143532 C2 * | 11/1982 |

OTHER PUBLICATIONS

DE 2143532 A1—English translation (Year: 1972).*

*Primary Examiner* — Joseph M Rocca
*Assistant Examiner* — Julia C Tran
(74) *Attorney, Agent, or Firm* — Taft Stettinius & Hollister LLP; Stephen F. Rost

(57) ABSTRACT

An agricultural header comprises a first side draper belt, a second side draper belt, a first center draper belt, a second center draper belt, and a crop divider. The first and second center draper belts are positioned laterally between the first and second side draper belts which extend laterally outwardly in opposite directions away from the first and second center draper belts. Each of the first and second side draper belts are arranged to feed crop material laterally inwardly, and each of the first and second center draper belts are arranged to feed crop material rearwardly for processing by the agricultural harvester. The crop divider is positioned laterally between the first and second center draper belts to separate crop material fed laterally inwardly from the first and second side draper belts respectively to the first and second center draper belts.

20 Claims, 18 Drawing Sheets

(51) Int. Cl.
*A01D 34/14* (2006.01)
*A01D 41/14* (2006.01)
*A01D 57/20* (2006.01)
*A01D 61/00* (2006.01)

(52) U.S. Cl.
CPC ............ *A01D 61/008* (2013.01); *A01D 34/04* (2013.01); *A01D 34/14* (2013.01); *A01D 41/14* (2013.01)

(56) References Cited

U.S. PATENT DOCUMENTS

| | | | |
|---|---|---|---|
| 7,470,180 B2 | 12/2008 | Honey | |
| 9,161,492 B2* | 10/2015 | Fuechtling | A01D 41/14 |
| 10,292,331 B2 | 5/2019 | Lauwers et al. | |
| 10,321,628 B2 | 6/2019 | Borry et al. | |
| 10,412,891 B2 | 9/2019 | Joyce et al. | |
| 10,426,088 B2 | 10/2019 | Mossman | |
| 10,440,888 B2 | 10/2019 | Farley et al. | |
| 10,820,496 B2 | 11/2020 | Cook | |
| 2003/0037528 A1* | 2/2003 | Glazik | A01D 63/04 56/99 |
| 2007/0033913 A1* | 2/2007 | Kincaid | A01D 41/12 56/16.5 |
| 2008/0161077 A1 | 7/2008 | Honey | |
| 2008/0202090 A1* | 8/2008 | Lovett | A01D 57/20 198/837 |
| 2008/0295474 A1* | 12/2008 | Tippery | A01D 57/20 56/153 |
| 2012/0047866 A1* | 3/2012 | Fuechtling | A01D 41/14 56/153 |
| 2014/0298765 A1* | 10/2014 | Fuechtling | A01D 57/20 56/153 |
| 2018/0084724 A1* | 3/2018 | Fuchtling | A01D 57/20 |
| 2021/0120741 A1* | 4/2021 | Sorensen | A01D 41/06 |
| 2022/0053702 A1* | 2/2022 | Andersen | A01F 12/10 |
| 2022/0248606 A1* | 8/2022 | Lohrentz | A01D 63/04 |
| 2022/0272901 A1* | 9/2022 | Todderud | A01D 57/20 |

* cited by examiner

AGRICULTURAL HEADER WITH INTER-BELT CROP DIVIDER

RELATED APPLICATIONS

This application claims the benefit of U.S. Provisional Patent Application Ser. No. 63/211,255, filed Jun. 16, 2021, the disclosure of which is hereby incorporated by reference in its entirety.

FIELD OF THE DISCLOSURE

The present disclosure relates to an agricultural header for use with an agricultural harvester.

BACKGROUND OF THE DISCLOSURE

Agricultural draper headers are used with agricultural harvesters, such as combines, to harvest a crop. The header has a plurality of draper belts. The draper belts transport crop material cut by a cutter bar of the header material laterally inwardly and rearwardly to a feederhouse of the harvester for processing by the harvester.

SUMMARY OF THE DISCLOSURE

According to an aspect of the present disclosure, there is disclosed an agricultural header for use with an agricultural harvester. The agricultural header is operable in a forward direction of travel to harvest crop material, and comprises a first side draper belt, a second side draper belt, a first center draper belt, a second center draper belt, and a crop divider. The first and second center draper belts are positioned laterally between the first and second side draper belts which extend laterally outwardly in opposite directions away from the first and second center draper belts. Each of the first and second side draper belts are arranged to feed crop material laterally inwardly, and each of the first and second center draper belts are arranged to feed crop material rearwardly for processing by the agricultural harvester. The crop divider is positioned laterally between the first and second center draper belts to separate crop material fed laterally inwardly from the first and second side draper belts respectively to the first and second center draper belts. The crop divider comprises shingling and a panel. The shingling overlaps the first and second center draper belts thereabove. The panel extends in a fore-aft dimension of the agricultural header and rises vertically above the first and second center draper belts and the shingling.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
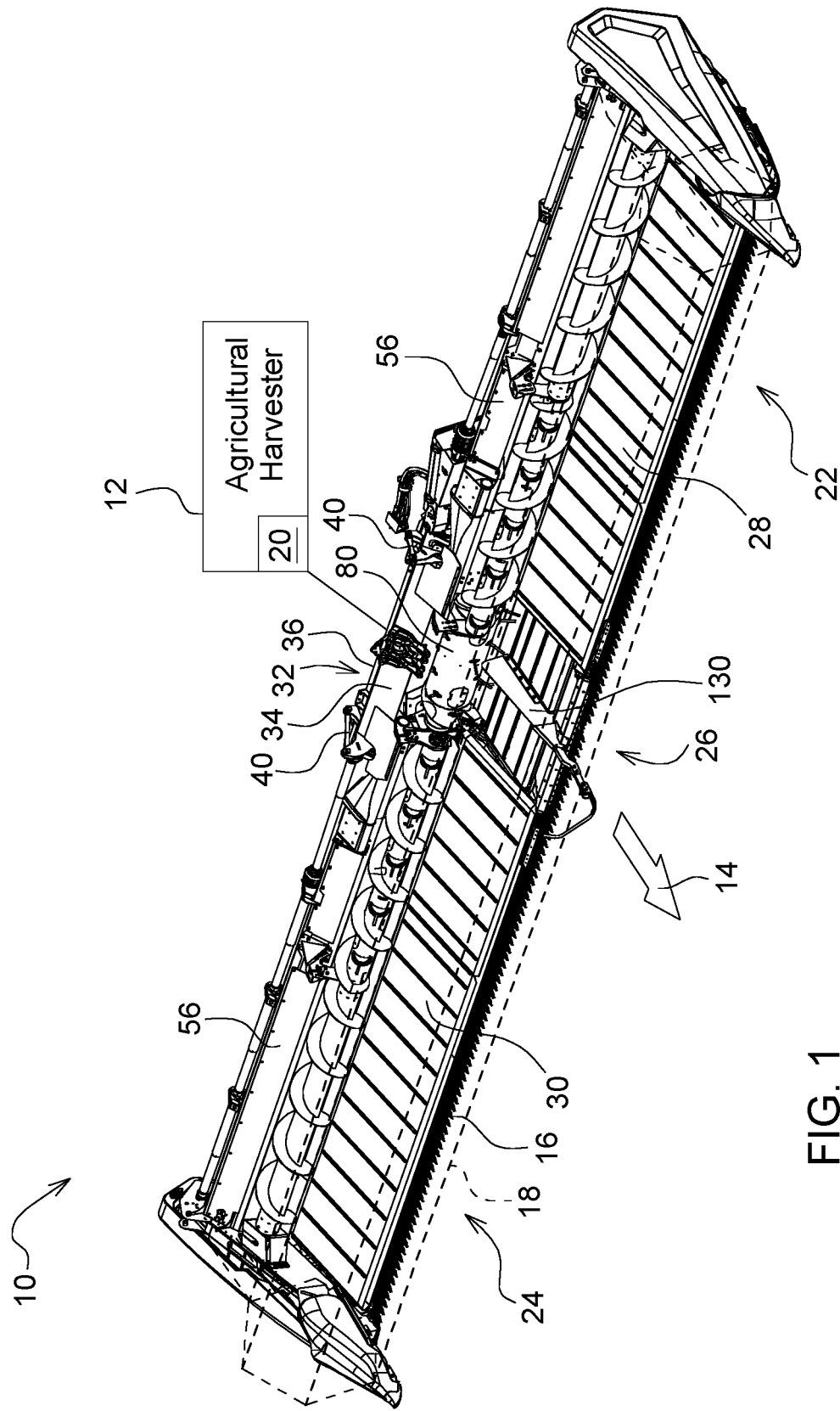
FIG. 1 is a perspective view showing an agricultural header including two side draper belts, two center draper belts positioned laterally between the side draper belts, and a crop divider positioned laterally between the center draper belts.
Figure 2:
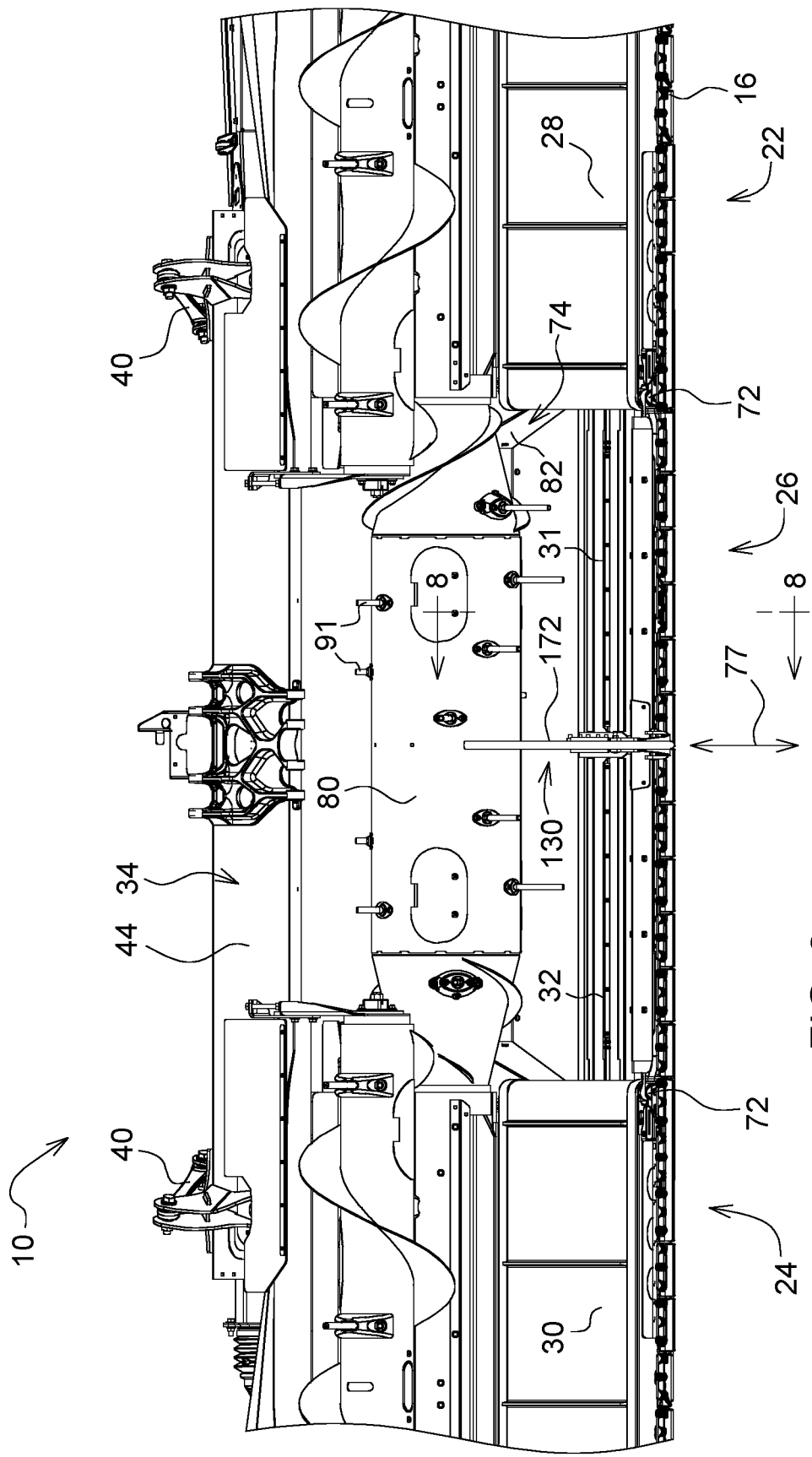
FIG. 2 is a front elevational view, with portions broken away, showing the agricultural header.
Figure 3:
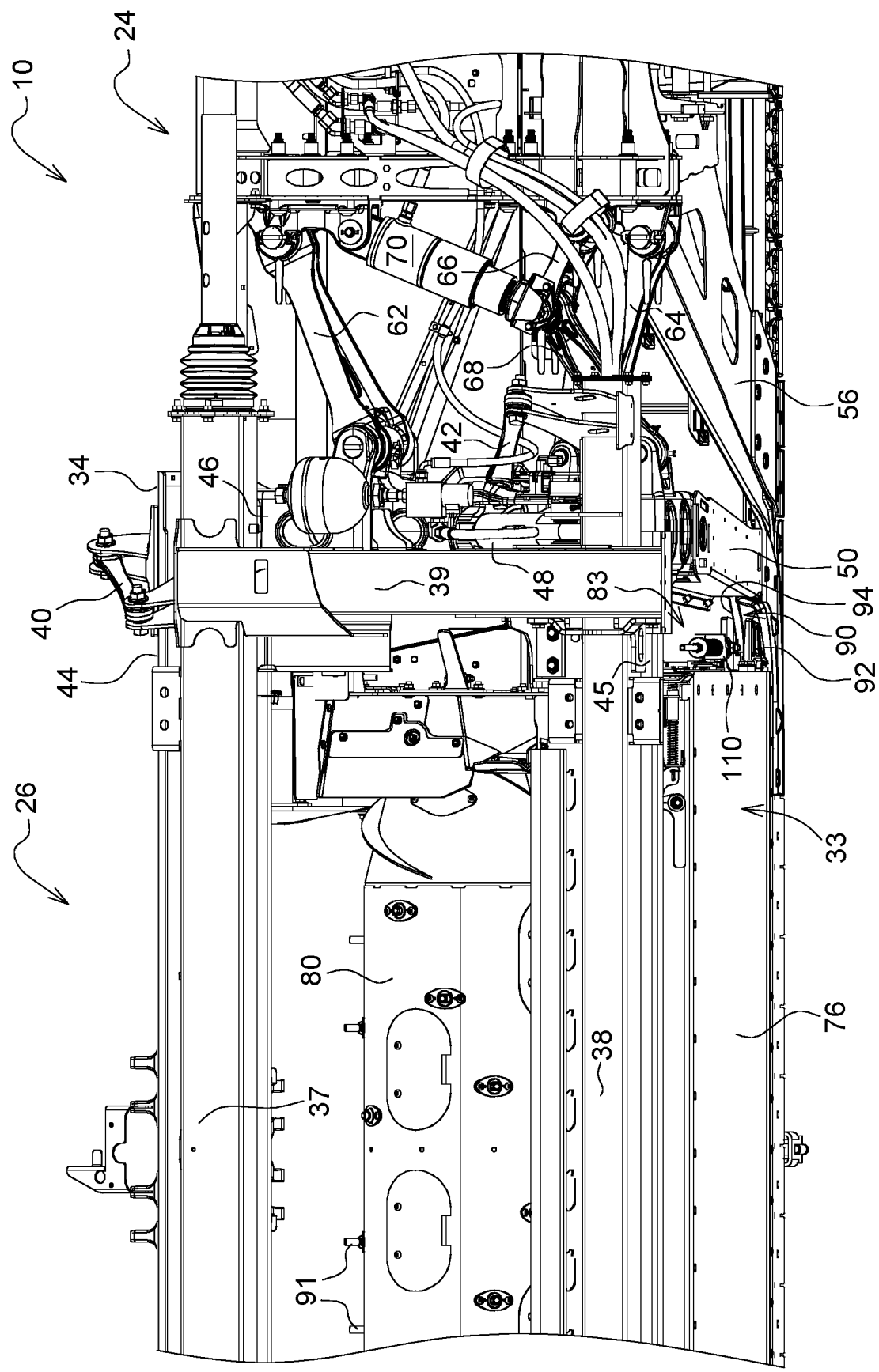
FIG. 3 is a rear elevational view showing coupling of a side section of the agricultural header to a center section of the header, and showing coupling of a center main frame of the center section to an attachment frame.

Referring to FIGS. 1-3, an agricultural header 10 is provided for use with an agricultural harvester 12 shown diagrammatically (e.g., a combine harvester). The agricultural header 10 is coupled to the agricultural harvester 12 to be propelled thereby in a forward direction of travel 14 over a field. The agricultural header 10 is operable in the forward direction of travel 14 to harvester crop material. The header 10 cuts, gathers, and feeds the crop material to the harvester 12 for processing thereby.

The header 10 includes a cutter bar 16 extending laterally relative to the forward direction of travel 14 and configured to cut crop material. The cutter bar 16 has a reciprocating knife that severs the stalk of the crop material. A reel 18 of the header 10 moves the cut crop material rearwardly, opposite to the forward direction of travel 14, onto draper belts of the header 10 behind the cutter bar 16, which transport the cut crop material to a feederhouse 20 of the harvester 12 for intake into the harvester 12 and processing thereby (feederhouse 20 is shown diagrammatically).

The header 10 includes a first side section 22, a second side section 24, and a center section 26 positioned laterally between the first and second side sections 22, 24. The first and second side sections 22, 24 are positioned on and coupled to laterally opposite sides of the center section 26 such that the first and second side sections 22, 24 extend in laterally opposite directions from the center section 26. The first side section 22 includes a first side draper belt 28, and the second side section 24 includes a second side draper belt 30. The center section 26 includes a first center draper belt 31 and a second center draper belt 32. The first and second side draper belts 28, 30 extend laterally outwardly in opposite directions away from the first and second center draper belts 31, 32. Each of the first and second side draper belts 28, 30 is arranged to feed crop material laterally inwardly toward the center section 26. Each of the first and second center draper belts 31, 32 is arranged to feed crop material rearwardly for intake into the feederhouse 20 and processing by the agricultural harvester 12.

The side draper belts 28, 30 and the center draper belts 31, 32 are positioned behind the cutter bar 16 relative to the forward direction of travel 14 to receive cut crop material therefrom. The side draper belts 28, 30 advance cut crop material laterally to the center draper belts 31, 32, respectively. The center draper belts 31, 32 are positioned laterally between the first and second side draper belts 28, 30 to receive crop material respectively therefrom. The center draper belts 31, 32 advance crop material received from the cutter bar 16 and the side draper belts 28, 30 to the feederhouse 20.

The center section 26 is supported by and in communication with the feederhouse 20 when the header 10 is coupled to the harvester 12. The center section 26 includes a center support frame 33 coupled to the feederhouse 20 and a center main frame 34 coupled to the center support frame 33 for movement relative thereto. The center support frame 33 includes an attachment frame 36 coupled to the feederhouse 20 in fixed relation thereto.

The center main frame 34 is coupled to the attachment frame 36 via a four-bar linkage of the header 10 for movement relative to the attachment frame 36 in response to changes in the terrain. The four-bar linkage includes two upper links 40, which are similar to one another, and two lower links 42, which are similar to one another (only one lower link 42 shown). The upper and lower links 40, 42 are coupled to the center main frame 34 and the attachment frame 36 so as to interconnect the frames 34, 36. The center main frame 34 includes an upper lateral member 44, a lower lateral member 45, a first upright side member 46, and a second upright side member 46, the upper and lower lateral members 44, 45 coupled fixedly (e.g., welded) to the upright side members 46. The attachment frame 36 includes an upper lateral member 37, a lower lateral member 38, a first upright side member 39, and a second upright side member 39 (not shown but similar to the other upright side member 39), the upper and lower lateral members 37, 38 coupled fixedly (e.g., welded) to the upright side members 39. The upper links 40 are coupled pivotally to the upper lateral members 37, 44 of the attachment frame 36 and the center main frame 34. The lower links 42 are coupled pivotally to the lower lateral member 38 of the attachment frame 36 and coupled pivotally respectively to the first and second upright side members 46 of the center main frame 34.

The center main frame 34 is coupled to the attachment frame 36 via a first and a second hydraulic cylinder 48 of the header 10, which are similar to one another (second hydraulic cylinder 48 not shown). Pressure in the two cylinders 48 is regulated to establish a desired terrain-following capacity. The first cylinder 48 is coupled pivotally to the lower lateral member 38 of the attachment frame 36 and the first upright side member 46 of the center main frame 34, and the second cylinder 48 is coupled pivotally to the lower lateral member 38 of the attachment frame 36 and the second upright side member 46 of the center main frame 34.

Each side section 22, 24 has a side frame 56 and rollers mounted thereto. The cutter bar 16 is coupled to the side frame 56 of each side section 22, 24. The side frame 56 supports the respective side draper belt 28, 30. The side draper belt 28, 30 is entrained about the rollers of the side section 22, 24 to form a closed loop. A motor drives one of the rollers to circulate the side draper belt 28, 30 about a closed-loop path.

Referring to FIG. 3, the side sections 22, 24 may be coupled to the center section 26 in a wide variety of ways. For example, each side frame 56 is coupled to the center main frame 34 with a set of links for movement relative thereto. The set of links includes an upper link 62 and a lower link 64. Each of the upper and lower links 62, 64 is coupled pivotally to the side frame 56 and the center main frame 34. The set includes a first support link 66, a second support link 68, and a hydraulic cylinder 70. The first support link 66 is coupled pivotally to the side frame 56 and an axle. The second support link 68 is coupled pivotally to the center main frame 34 and the axle. The hydraulic cylinder 70 is coupled pivotally to the axle and the side frame 56, such that operation of the hydraulic cylinder 70 pivots the side section 22, 24 and the side frame 56 thereof relative to the center main frame 34.

Figure 4:
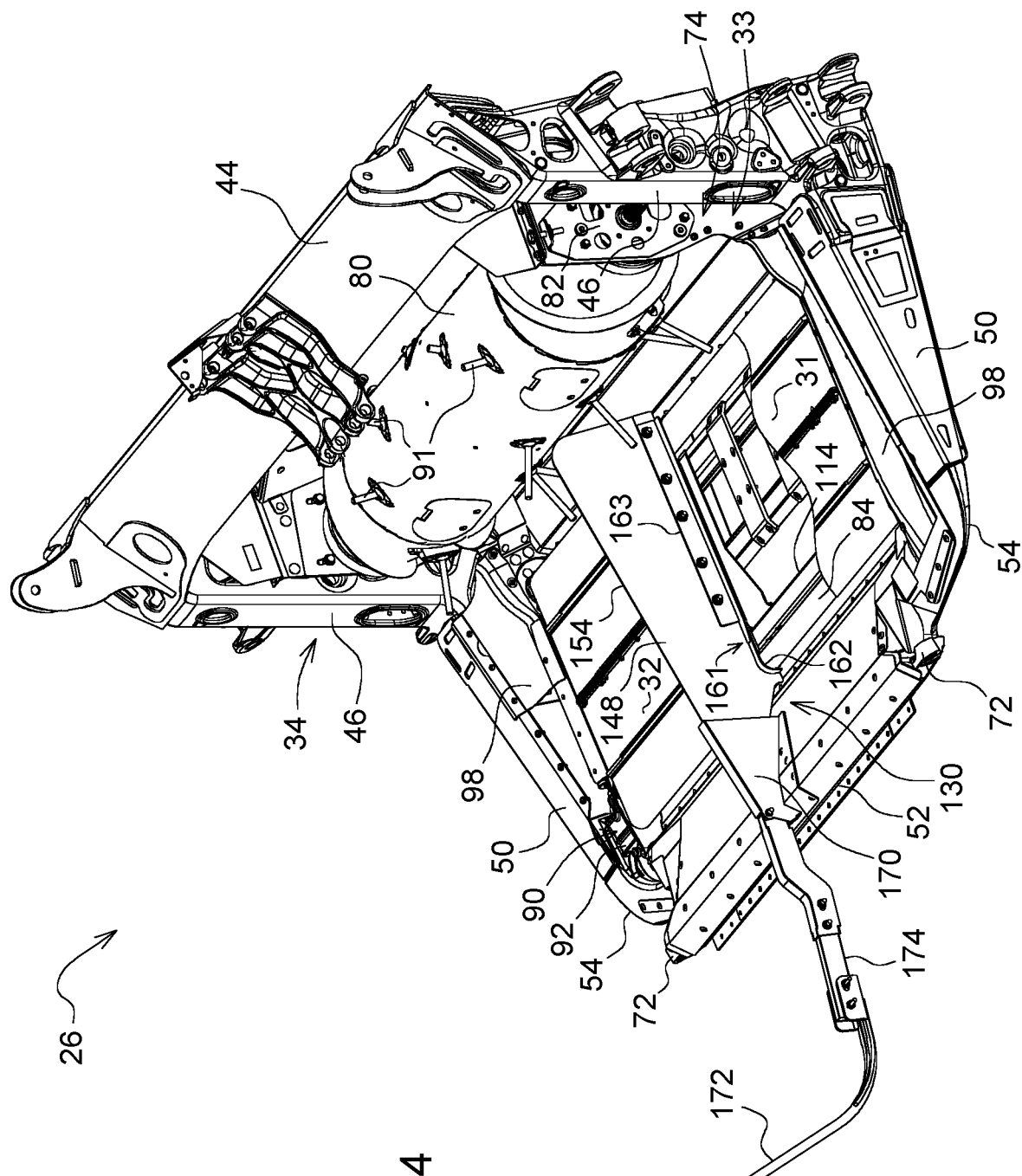
FIG. 4 is a perspective view, with portion broken away, showing the center section with the crop divider positioned laterally between the center draper belts.

Referring to FIGS. 2 and 4, each side section 22, 24 is further coupled to and supported by the center main frame 34 at a front pivot point 72. The side frame 56 is coupled to the center main frame 34 at the front pivot point 72. The pivot point 72 is configured, for example, as a hinge.

Referring to FIGS. 3 and 4, the center main frame 34 includes a first and a second fore-aft side member 50, a laterally-extending front member 52, and a first and second corner 54. The first fore-aft side member 50 is coupled fixedly (e.g., welded) to, and projects forwardly from, the first upright side member 46 of the center main frame 34. The second fore-aft side member 50 is coupled fixedly (e.g., welded) to, and projects forwardly from, the second upright side member 46 of the center main frame 34. The first corner 54 interconnects the first fore-aft side member 50 and the front member 52, and the second corner 54 interconnects the second fore-aft side member 50 and the front member 52. The cutter bar 16 is coupled to the front member 52.

Referring to FIGS. 2 and 3, the center support frame 33 includes a feed frame 74 and a center belt frame 76 (which may also be called a center tension frame or a center draper frame). The center belt frame 76 is positioned laterally between the first and second fore-aft side members 50 of the center main frame 34. The feed frame 74 is positioned between the attachment frame 36 and the center belt frame 76 relative to a fore-aft dimension 77 of the header 10 parallel to the forward direction of travel 14. The feed frame 74 is coupled fixedly to the attachment frame 36 (e.g., bolted). The center belt frame 76 is coupled pivotally to the feed frame 74 to pivot about an axis 78.

The header 10 includes a feed drum 80 and tines 91. The feed drum 80 is coupled rotatably to, and positioned laterally between, first and second side walls 82 of the feed frame 74. The feed drum 80 is driven in rotation by a drum motor. The tines 91 project from the periphery of the feed drum 80 to advance cut crop material toward the intake of the feederhouse 20 upon rotation of the feed drum 80 by the drum motor.

Figure 5:
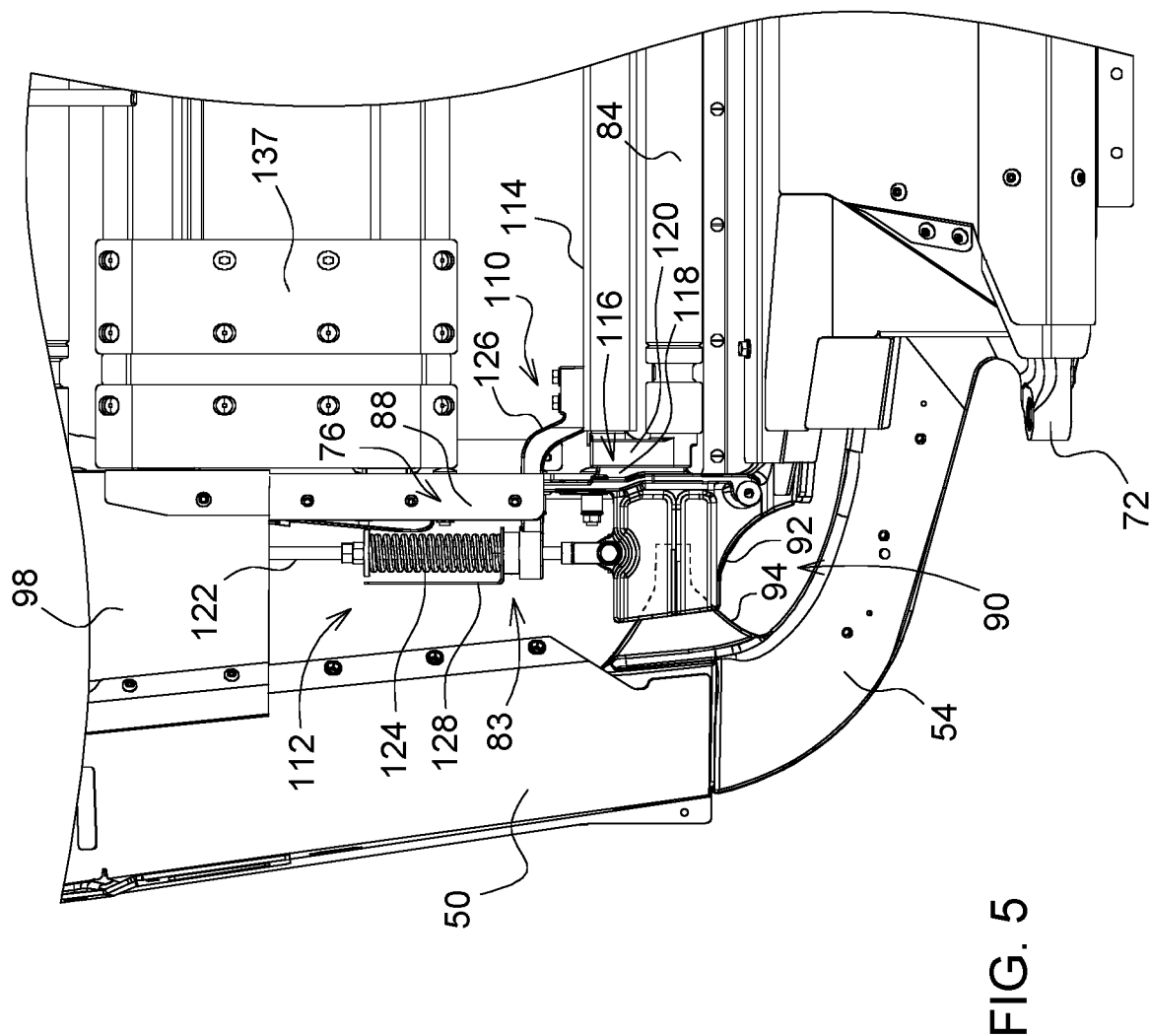
FIG. 5 is a top view, with portions broken away, showing a belt tensioner for tensioning the center draper belts.
Figure 6:
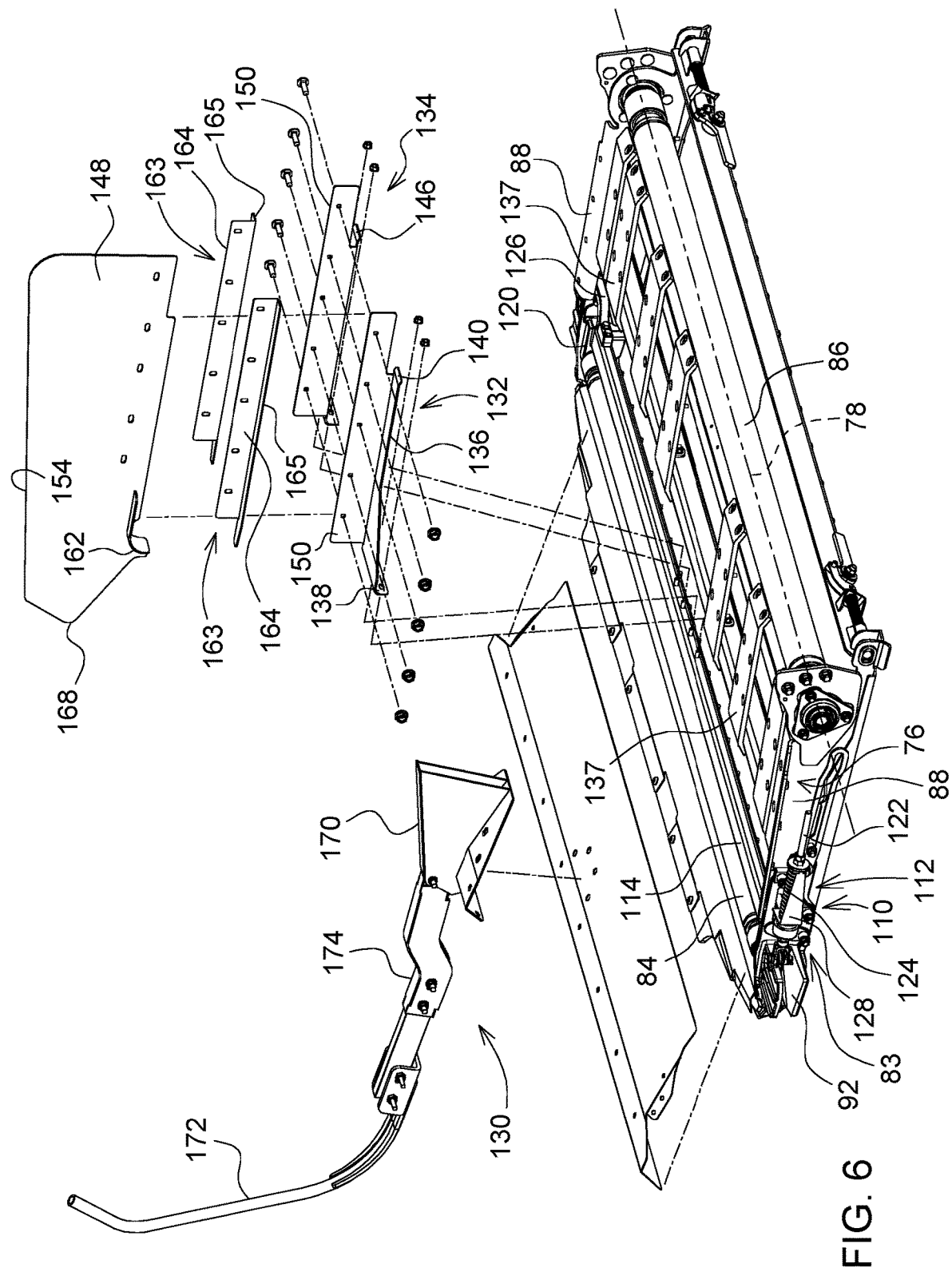
FIG. 6 is a perspective view showing the crop divider exploded from a center belt frame.
Figure 7:
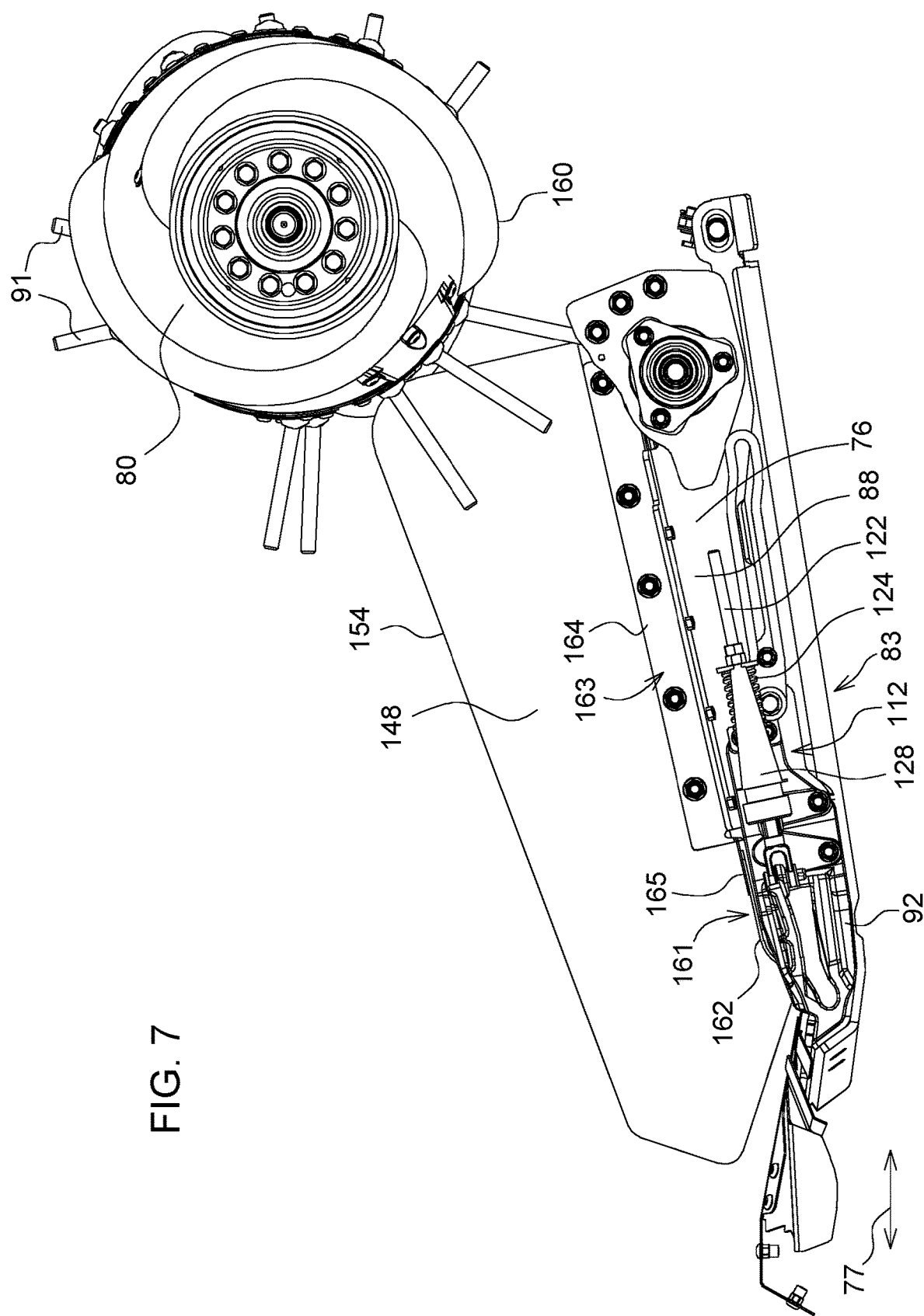
FIG. 7 is a side elevation view showing the crop divider with at least a portion of its top margin at least as high as a lower portion of a feed drum of the header.
Figure 8:
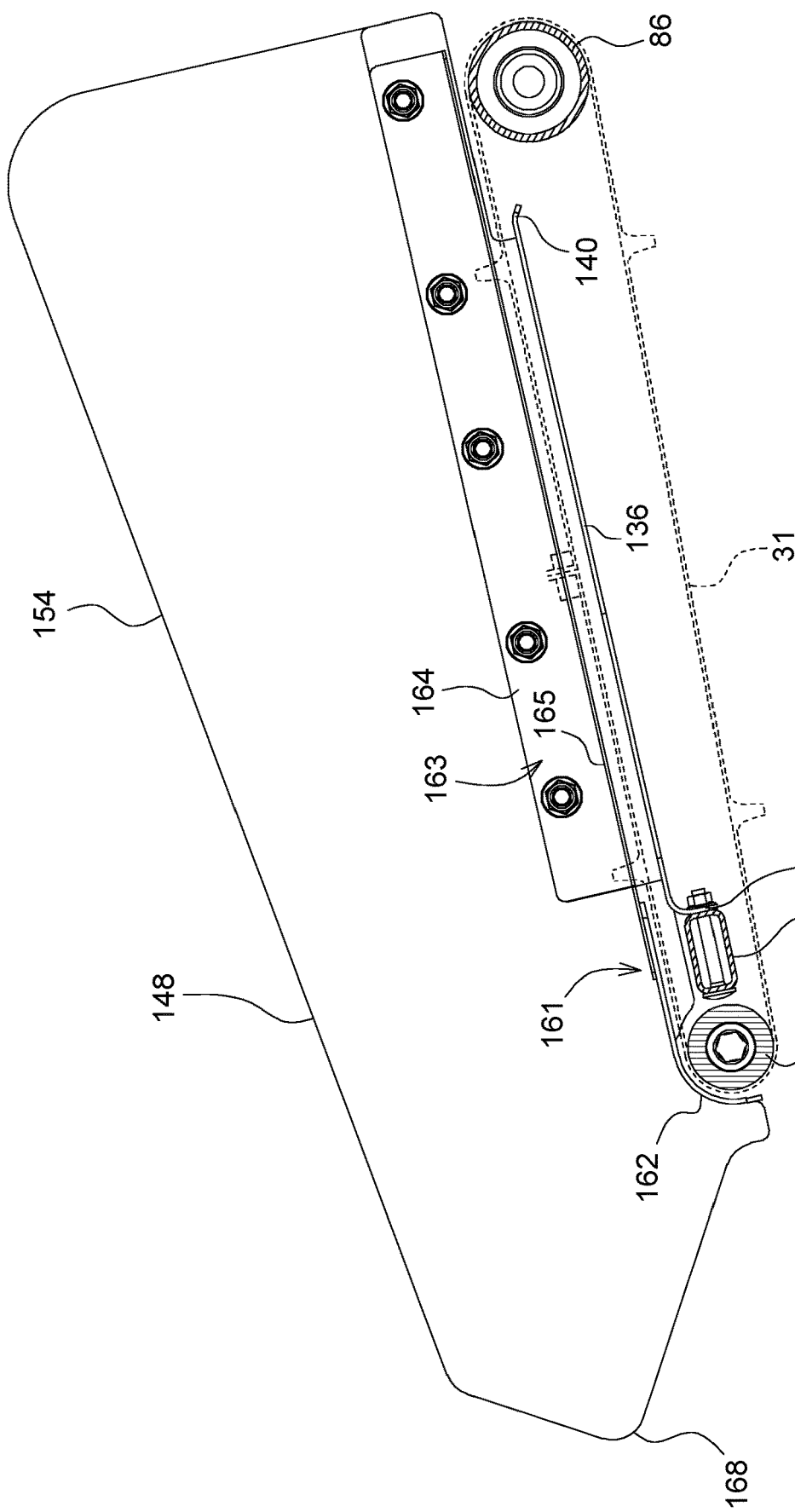
FIG. 8 is a sectional view, taken along lines 8-8 of FIG. 2, showing mounting of a panel of the crop divider.
Figure 9:
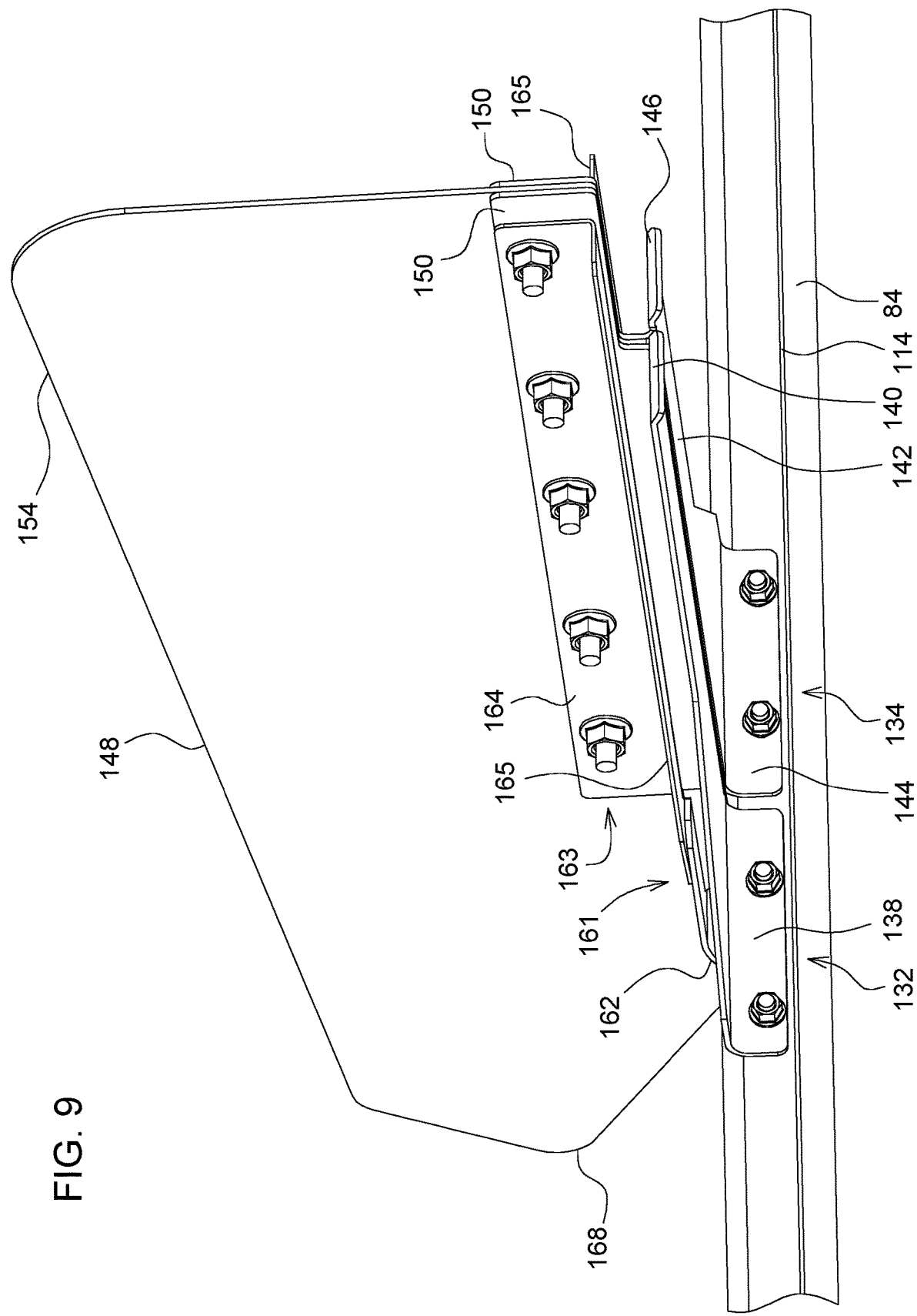
FIG. 9 is a perspective view showing mounting of the panel to a bar of the belt tensioner with first and second mounting brackets.
Figure 10:
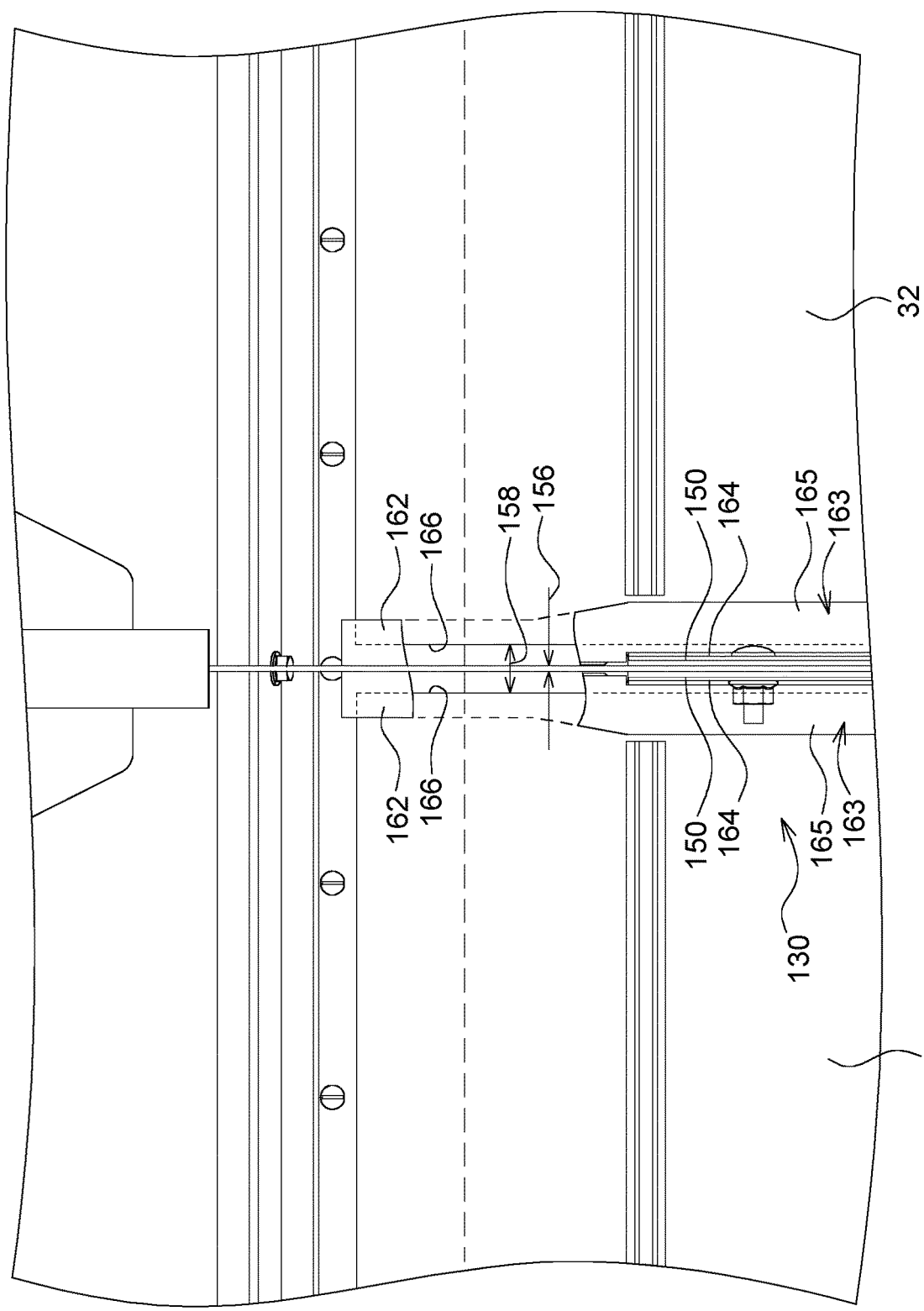
FIG. 10 is a top view showing the top margin of the crop divider with a lateral thickness less than a lateral gap between the center draper belts.
Figure 11:
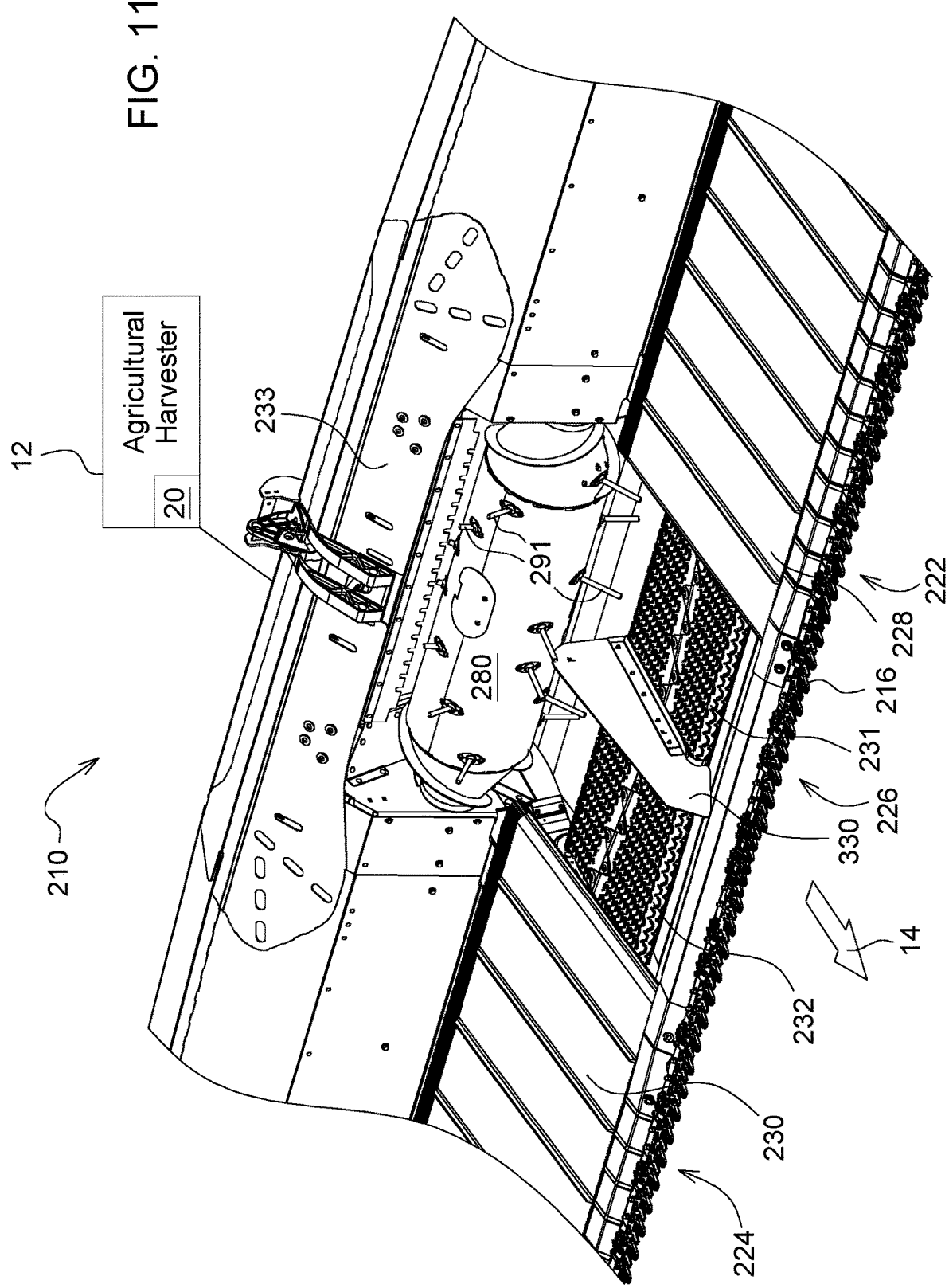
FIG. 11 is a perspective view showing an agricultural header according to a second embodiment including two side draper belts, two center draper belts positioned laterally between the side draper belts, and a crop divider positioned laterally between the center draper belts.

Referring to FIGS. 5 and 6, the center section 26 includes a support structure 83 on which the first and second center draper belts 31, 32 are supported. The support structure 83 includes the center belt frame 76, a front roller 84, and a rear roller 86. The rear roller 86 is coupled rotatably to the center belt frame 76. The rear roller 86 is coupled rotatably to, and positioned laterally between, first and second fore-aft side members 88 of the center belt frame 76. The fore-aft side members 88 are similar to one another. The first and second fore-aft side members 88 are coupled rotatably respectively to the first and second side walls 82 of the feed frame 74. Alternatively, the first and second fore-aft side members 88 may be coupled fixedly (e.g., bolted) to the first and second side walls 82 of the feed frame 74.

Referring to FIGS. 4-6, the first and second center draper belts 31, 32 are entrained about the front roller 86 and the rear roller 88. The rear roller 86 is driven in rotation by a motor to circulate the center draper belts 31, 32 in a feeding direction to move crop material toward the feederhouse 20 or in a reverse direction.

The center main frame 34 is coupled to the center belt frame 76 for movement relative thereto. The center main frame 34 is coupled to the center belt frame 76 with a joint 90 on either side of the center belt frame 76 such that each joint 90 is positioned laterally between the center main frame 34 and the center belt frame 76 (the joints 90 are similar to one another, with only one joint 90 shown). Each joint 90 interconnects the frames 34, 76 and enables relative fore-aft, lateral, and vertical translation between the frames 34, 76. Each cylinder 48 is coupled to the attachment frame 36 and the center main frame 34 to cause relative fore-aft and lateral translation between the center main frame 34 and the center belt frame 76 enabled by each joint 90. Relative movement between the frames 34, 76 can occur in response to terrain-following of the header 10 as modified by cylinders 48.

The first fore-aft side member 50 of the center main frame 34 is coupled to the first fore-aft side member 88 of the center belt frame 76 with a first joint 90 such that the first joint 90 is coupled to, and positioned laterally between, the first fore-aft side member 50 of the center main frame 34 and the first fore-aft side member 88 of the center belt frame 76. The second fore-aft side member 50 of the center main frame 34 is coupled to the second fore-aft side member 88 of the center belt frame 76 with a second joint 90 (portions shown) such that the second joint 90 is coupled to, and positioned laterally between, the second fore-aft side member 50 of the center main frame 34 and the second fore-aft side member 88 of the center belt frame 76.

Each of the joints 90 may be a sliding joint. For example, each joint 90 includes a clevis 92 and a puck 94 positioned in the clevis 92. In the illustrated example, the devises 92 of the first and second joints 90 are coupled respectively to the first and second fore-aft side members 88 of the center belt frame 76, and the pucks 94 of the first and second joints 90 are coupled respectively to the first and second fore-aft side members 50 of the center main frame 34. With respect to each joint 90, the clevis 92 includes an interior region into which the puck 94 extends for relative fore-aft and lateral translation between the clevis 92 and the puck 94.

The header 10 may include an inter-frame first and second flexible seal 98. Each inter-frame flexible seal 98 is coupled to the center main frame 34 and the center belt frame 76. The first seal 98 spans a first gap between the first fore-aft side member 50 of the center main frame 34 and the first fore-aft side member 88 of the center belt frame 76. The first seal 98 underlies the first side draper belt 28 to receive cut crop material that falls from that first side draper belt 28 and is arranged relative to the first center draper belt 31 to guide fallen crop material toward the first center draper belt 31. The second seal 98 spans a second gap between the second fore-aft side member 50 of the center main frame 34 and the second fore-aft side member 88 of the center belt frame 76. The second seal 98 underlies the second side draper belt 30 to receive cut crop material that falls from that second side draper belt 30 and is arranged relative to the second center draper belt 32 to guide fallen crop material toward the second center draper belt 32.

The support structure 83 includes a belt tensioner 110 that tensions the first and second center draper belts 31, 32. The belt tensioner 110 urges the front roller 84 forwardly away from the rear roller 86 to tension the belts 31, 32.

The belt tensioner 110 includes a first tensioning assembly 112, a second tensioning assembly 112, and a bar 114 coupled to the first and second tensioning assemblies 112 therebetween and to the front roller 84. The bar 114, which may be referred to as a torsion bar, is yieldably biased forwardly away from the rear roller 86 by the first and second tensioning assemblies 112 to urge the front roller 84 forwardly.

The front roller 84 and the bar 114 are coupled to the center belt frame 76 for fore-aft movement relative thereto. The front roller 84 and the bar 114 are coupled to the first fore-aft side member 88 of the center belt frame 76 via a first joint 116 and to the second fore-aft side member 88 of the center belt frame 76 via a second joint 116.

Each joint 112 may include, for example, a puck 118 and a clevis 120 in which the puck 118 is positioned 120. The puck 118 may be integrated into the respective fore-aft side member 88. The clevis 120 is fixed to a respective end of each of the front roller 84 and the bar 114. The clevis 120 is supported on the puck 118 for fore-aft translation relative thereto.

Each tensioning assembly 112 includes a post 122, a spring 124 surrounding the post 122, and an arm 126. The post 122 is pivotally coupled to the clevis 92 of a respective joint 90 at a first end of the post 122, and extends through an eye of the arm 126, a plate 128, and the spring 124. The spring 124 is grounded against a stop at a second end of the post 122, and presses against the plate 128 to urge the arm 126 forwardly. The arm 126 extends laterally through an aperture in the respective fore-aft side member 88 and is coupled to the bar 114 to urge the bar 114 and the roller 84 forwardly so as to tension the center draper belt 60 in response to operation of the spring 124.

The clevis 92 of the joint 90, and the puck 118 of the joint 112 may be integrated into a single piece (e.g., casting). The single piece includes a fore-aft extension portion, which is included in the respective fore-aft side member 88 of the center belt frame 76 and includes the aperture through which the arm 126 of the respective tensioning assembly 112 extends. In other embodiments, the single piece may be constructed as multiple pieces.

Referring to FIGS. 2-10, the header 10 includes a crop divider 130. The crop divider 130 is positioned laterally between the first and second center draper belts 31, 32 to separate crop material fed laterally inwardly from the first and second side draper belts 28, 30 respectively to the first and second center draper belts 31, 32. Such separation promotes a relatively even feeding of crop material to the harvester 12, which is especially useful in the case of a harvester 12 with laterally adjacent, axially oriented threshing/separating rotors to prevent overloading or excessively uneven distribution of crop material to one rotor over against the other rotor, such as in a side-hill condition when one side section 22, 24 is uphill relative to the center second 26 and the other side section 22, 24 is downhill relative to the center second 26.

Referring to FIGS. 6-10, the crop divider 130 is mounted to the support structure 83. Illustratively, the crop divider 130 is mounted to the belt tensioner 110 for movement therewith relative to the center belt frame 76. For example, the crop divider 130 is mounted to the bar 114 for movement therewith.

The crop divider 130 includes a first mounting bracket 132 and a second mounting bracket 134. The first and second mounting brackets 132, 134 are mirror images of one another, and are spaced laterally apart from one another. The mounting brackets 132, 134 are mounted to the support structure 83. The first and second mounting brackets 132, 134 are mounted to the bar 114 for movement therewith. A first flange 136 of the first mounting bracket 132 underlies the first center draper belt 31 and is coupled to the bar 114. The first flange 136 is supported on skid plates 137 coupled to the center belt frame 76. A first tab 138 of the first mounting bracket 132 extends downwardly from a front portion of the first flange 136 and is coupled (e.g., bolted) to a rear side of the bar 114 so as to be fixed thereto. A first lip 140 is declined from a rear portion of the first flange 136 to facilitate movement of the first center draper belt 31 over the first flange 136. A second flange 142 of the second mounting bracket 134 underlies the second center draper belt 32 and is coupled to the bar 114. The second flange 142 is supported on other skid plates 137 coupled to the center belt frame 76. A second tab 144 of the second mounting bracket 136 extends downwardly from a front portion of the second flange 142 and is coupled (e.g., bolted) to a rear side of the bar 114 so as to be fixed thereto. A second lip 146 is declined from a rear portion of the second flange 142 to facilitate movement of the second center draper belt 32 over the second flange 142.

The crop divider 130 includes an upright panel 148 extending in the fore-aft dimension 77 of the header 10. The panel 148 rises vertically above the first and second center draper belts 31, 32, creating a barrier to block or otherwise inhibit flow of crop material from one lateral side of the panel 148 to the other.

The panel 148 is mounted to the first and second mounting brackets 132, 134. The brackets 132, 134 are coupled to the panel 148 (e.g., with bolts) and sandwich the panel 148 laterally therebetween. The mounting brackets 132, 134 are coupled to the panel 148 and the belt tensioner 110 for movement of the crop divider 130 with the belt tensioner 110 relative to the center belt frame 76.

The first mounting bracket 132 includes an upright attachment body 150, and the second mounting bracket 134 includes an upright attachment body 150. The first and second upright attachment bodies 150, 150 extend vertically from the first and second flanges 136, 142, respectively. The first and second attachment body 150, 150 are coupled to the panel 148 (e.g., with bolts) and sandwich the panel 148 laterally therebetween.

The panel 148 defines a top margin 154 of the crop divider 130. The top margin 154 has a lateral thickness 156 less than a lateral gap 158 between the first and second center draper belts 31, 32. In some embodiments, at least a portion of the top margin 154 is at least as high as a lower portion 160 of the feed drum 80.

The crop divider 130 includes shingling 161. The shingling 161 overlaps the first center draper belt 31 thereabove and the second center draper belt 32 thereabove. The panel 148 rises vertically above the first and second center draper belts 31, 32 and the shingling 161.

The shingling 161 includes a first shingle 162 and a second shingle 162. The first and second shingles 162, 162 are mirror images of one another. The first and second shingles 162, 162 overlap respectively the first and second center draper belts 31, 32 to inhibit build-up of material between the panel 148 and each center draper belt 31, 32. The first shingle 162 overlaps the first center draper belt 31 in front of and above the first center draper belt 31. The first shingle 162 extends laterally outwardly from the panel 148 so as to overlap a laterally inner edge 166 of the first center draper belt 31. The second shingle 162 overlaps the second center draper belt 32 in front of and above the second center draper belt 32. The second shingle 162 extends laterally outwardly from the panel 148 so as to overlap a laterally inner edge 166 of the second center draper belt 32. The first and second shingles 162, 162 are positioned below the top margin 154. Each shingle 162 is configured, for example, as a wall projecting laterally from the panel 148.

The crop divider 130 includes a first angle bracket 163 and a second angle bracket 163. The first and second angle brackets 163, 163 are mirror images of one another. The first and second angle brackets 163, 163 are coupled to the panel 148 and the attachment bodies 150 (e.g., with bolts) and sandwich the panel 148 and the attachment bodies 150 laterally therebetween. The first and second angle brackets 163, 163 overlap respectively the first and second center draper belts 31, 32 to inhibit build-up of material between the panel 148 and each center draper belt 31, 32.

Each angle bracket 163 includes an attachment body 164 and a shingle 165. The attachment bodies 164 are coupled to the panel 148 and the attachment bodies 150 (e.g., with bolts) and sandwich the panel 148 and the attachment bodies 150 laterally therebetween. The shingle 165 of the first angle bracket 163 is included in the shingling 161, overlaps the first shingle 150 above the first shingle 150, and overlaps the first center draper belt 31. The shingle 165 of the first angle bracket 163 extends laterally outwardly from the attachment body 164 of the first angle bracket 163 so as to overlap the laterally inner edge 166 of the first center draper belt 31. The shingle 165 of the second angle bracket 163 is included in the shingling 161, overlaps the second shingle 150 above the second shingle 150, and overlaps the second center draper belt 32. The shingle 165 of the second angle bracket 163 extends laterally outwardly from the attachment body 164 of the second angle bracket 163 so as to overlap the laterally inner edge 166 of the second center draper belt 32. The first and second angle brackets 163 and their attachment bodies 164 and shingles 165 are positioned below the top margin 154.

The panel 148 includes a nose 168. The nose 168 extends forwardly of the first and second center draper belts 31, 32 over the front member 52 of the center main frame 34, promoting separation of the flow of crop material between the first and second center draper belts 31, 32.

The crop divider 130 includes a sheath 170. The panel 148 extends into the sheath 170 for translation between the panel 148 and the sheath 170 (e.g., bolted). The sheath 170 is mounted to the front member 52 of the center main frame 34. The nose 168 of the panel 148 extends into the sheath 170 for relative translation between the panel 148 and the sheath 170. Such translation can occur in the fore-aft dimension 77 and vertically. In its nominal position, the nose 168 is spaced laterally apart from the vertical side walls of the sheath 170 to define a lateral gap therebetween. The panel 148 may deflect into contact with a respective side wall of the sheath 170 in response to lateral loading by crop material, such that the sheath 170 is configured to constrain lateral movement of the panel 148, including the nose 168 thereof.

The crop divider 130 includes a divider rod 172 and a rod mount 174. The divider rod 172 divides the crop material ahead of the panel 148. The divider rod 172 is coupled to the sheath 170 via the rod mount 174. The rod mount 174 includes a bracket to which the rod 172 is coupled (e.g., bolted), and an arm coupled (bolted) to the sheath 170 and the bracket.

In some embodiments, the sheath 170 may be omitted from the header 10. In such a case, the divider rod 172 may be mounted to the center main frame 34 so as to be included in the header 10, or the divider rod 172 and rod mount 174 may also be omitted.

Figure 12:
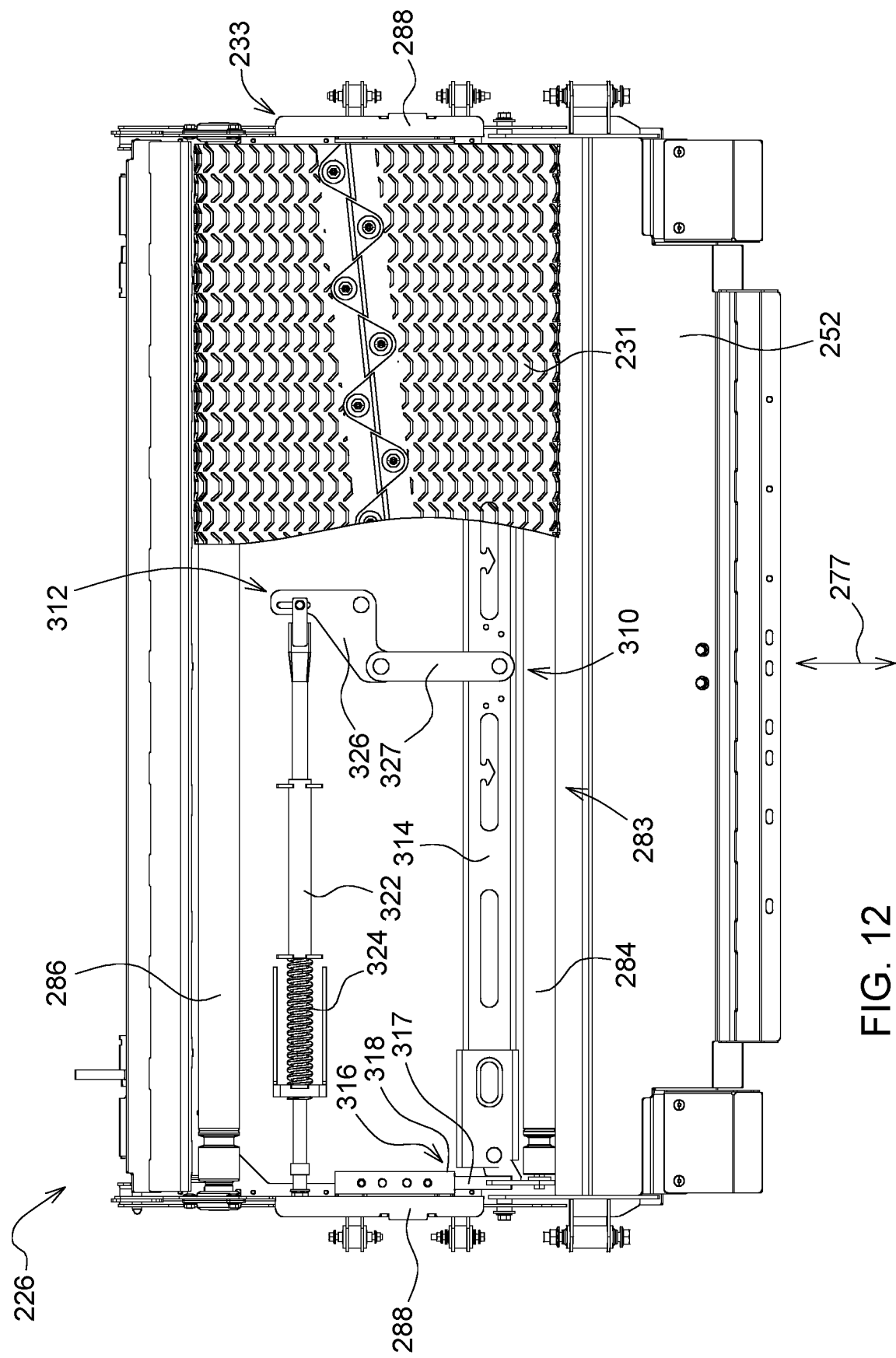
FIG. 12 is a top view, with portions broken away, showing a belt tensioner for tensioning the center draper belts in the second embodiment.

Referring to FIG. 12, there is shown another agricultural header 210, provided for use with the agricultural harvester 12. The agricultural header 210 is coupled to the agricultural harvester 12 to be propelled thereby in the forward direction of travel 14. The agricultural header 210 is operable in the forward direction of travel 14 to harvester crop material. The header 210 cuts, gathers, and feeds the crop material to the harvester 12 for processing thereby.

The header 210 includes a cutter bar 216 extending laterally relative to the forward direction of travel 14 and configured to cut crop material. The cutter bar 216 has a reciprocating knife that severs the stalk of the crop material. A reel (not shown) of the header 10 moves the cut crop material rearwardly, opposite to the forward direction of travel 14, onto draper belts of the header 210 behind the cutter bar 216, which transport the cut crop material to the feederhouse 20 of the harvester 12.

The header 210 includes a first side section 222, a second side section 224, and a center section 226 positioned laterally between the first and second side sections 222, 224. The first and second side sections 222, 224 are positioned on and coupled to laterally opposite sides of the center section 226 such that the first and second side sections 222, 224 extend in laterally opposite directions from the center section 226. The first side section 222 includes a first side draper belt 228, and the second side section 224 includes a second side draper belt 230. The center section 226 includes a first center draper belt 231 and a second center draper belt 232. The first and second side draper belts 228, 230 extend laterally outwardly in opposite directions away from the first and second center draper belts 231, 223. Each of the first and second side draper belts 228, 230 is arranged to feed crop material laterally inwardly toward the center section 226. Each of the first and second center draper belts 231, 232 is arranged to feed crop material rearwardly for intake into the feederhouse 20 and processing by the agricultural harvester 12.

The side draper belts 228, 230 and the center draper belts 231, 232 are positioned behind the cutter bar 216 relative to the forward direction of travel 14 to receive cut crop material therefrom. The side draper belts 228, 230 advance cut crop material laterally to the center draper belts 231, 232, respectively. The center draper belts 231, 232 are positioned laterally between the first and second side draper belts 228, 230 to receive crop material respectively therefrom. The center draper belts 231, 232 advance crop material received from the cutter bar 216 and the side draper belts 228, 230 to the feederhouse 20.

The header 210 includes a frame 233 that supports the first and second side draper belts 228, 230 and the first and second center draper belts 231, 232. The frame 233 is supported by and in communication with the feederhouse 20 when the header 210 is coupled to the harvester 12. Each side section 222, 224 includes rollers mounted to the frame 233 and about which the respective side draper belt 228, 230 is entrained to form a closed loop. A motor drives one of the rollers of the side section 222, 224 to circulate the side draper belt 228, 230 thereof about its closed-loop path.

The header 210 includes a feed drum 280 and tines 291. The feed drum 280 is coupled rotatably to the frame 233. The feed drum 280 is driven in rotation by a drum motor. The tines 291 project from the periphery of the feed drum 280 to advance cut crop material toward the intake of the feederhouse 20 upon rotation of the feed drum 280 by the drum motor.

Figure 13:
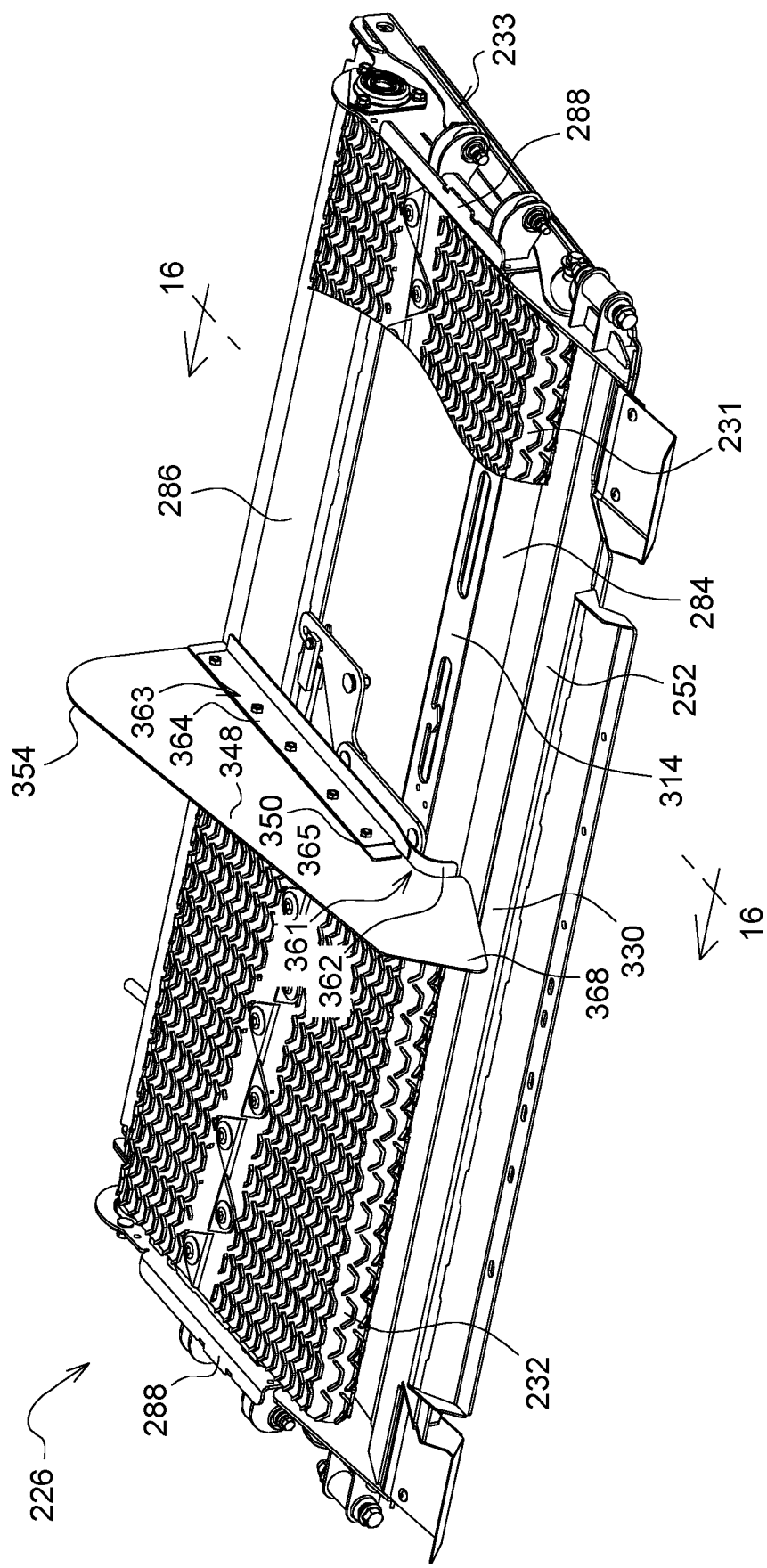
FIG. 13 is a perspective view, with portions broken away, showing a front roller and a bar of the belt tensioner of the second embodiment mounted for fore-aft movement relative to a frame.
Figure 14:
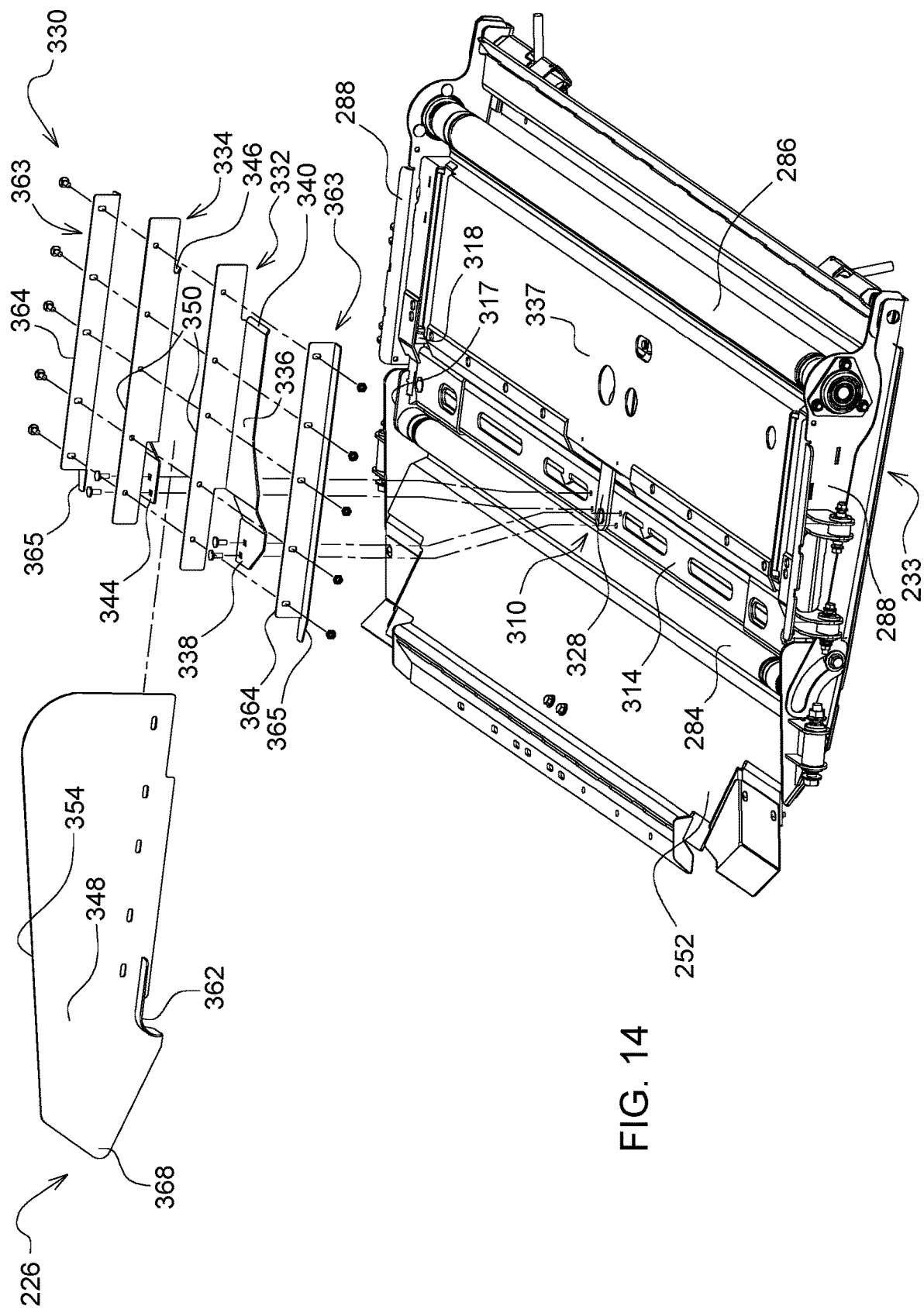
FIG. 14 is a perspective view showing the crop divider of the second embodiment exploded from the frame.
Figure 15:
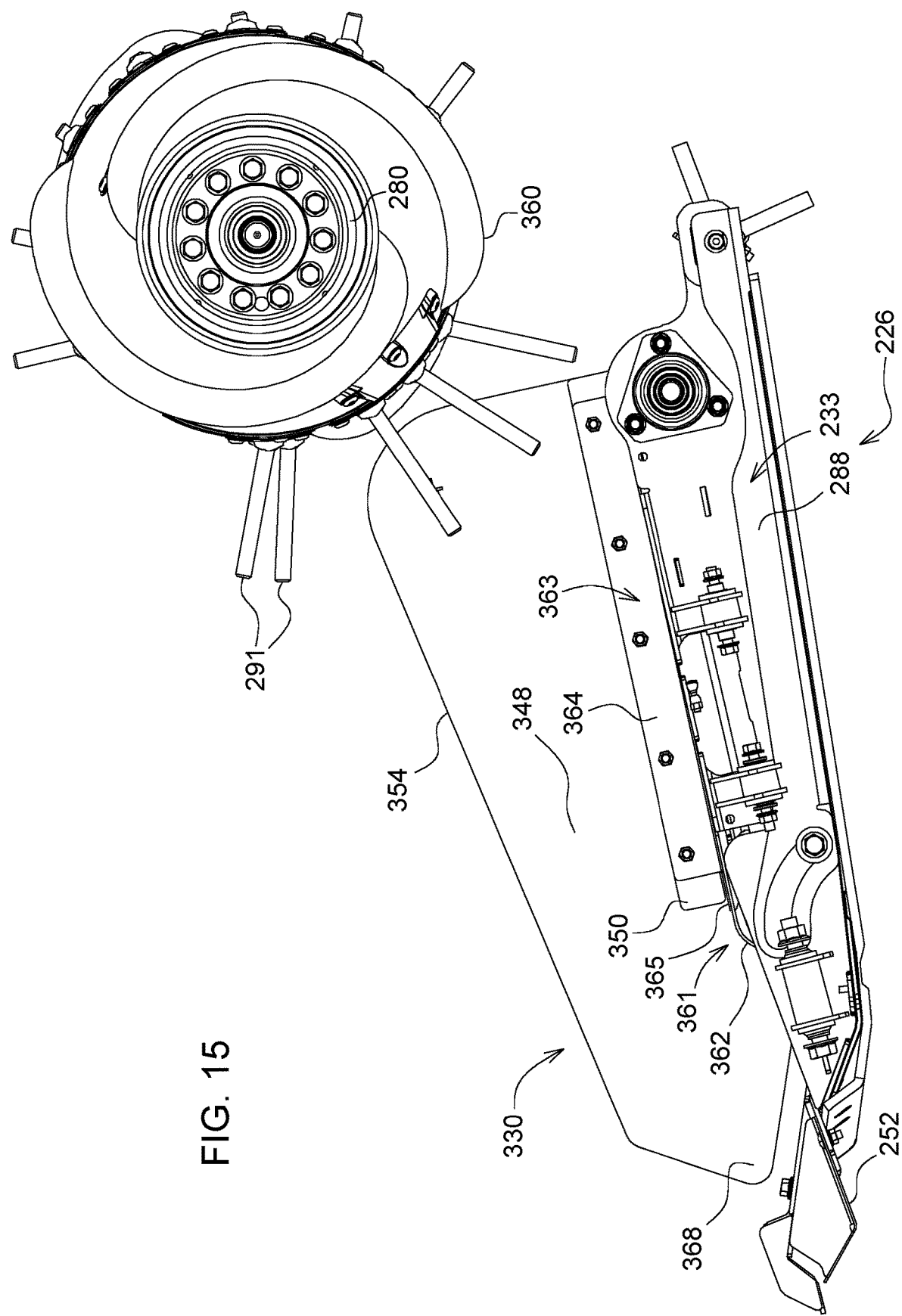
FIG. 15 is a side elevation view showing the crop divider of the second embodiment with at least a portion of its top margin at least as high as a lower portion of a feed drum.
Figure 16:
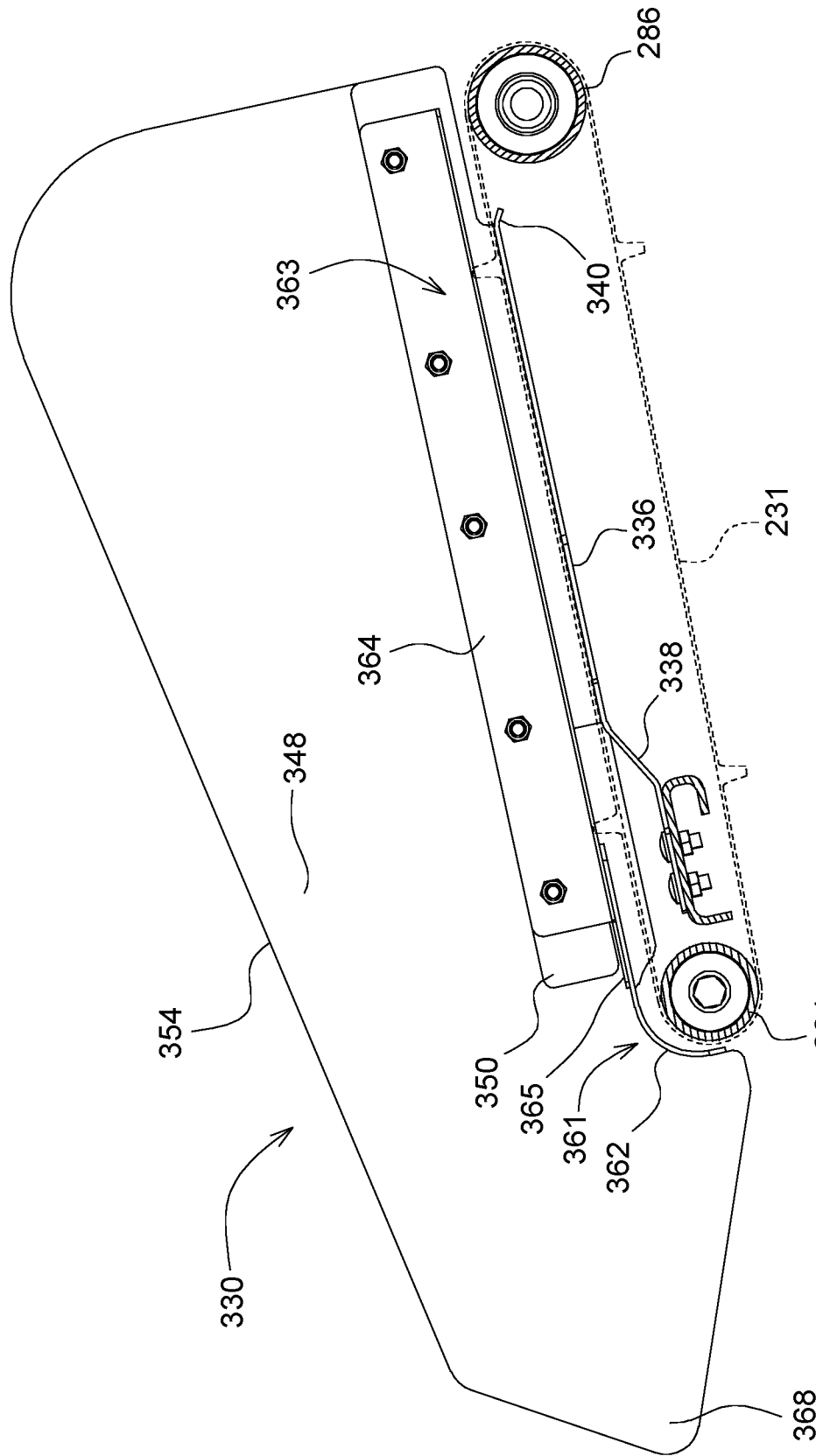
FIG. 16 is a sectional view, taken along lines 16-16 of FIG. 13, showing mounting of a panel of the crop divider of the second embodiment.
Figure 17:
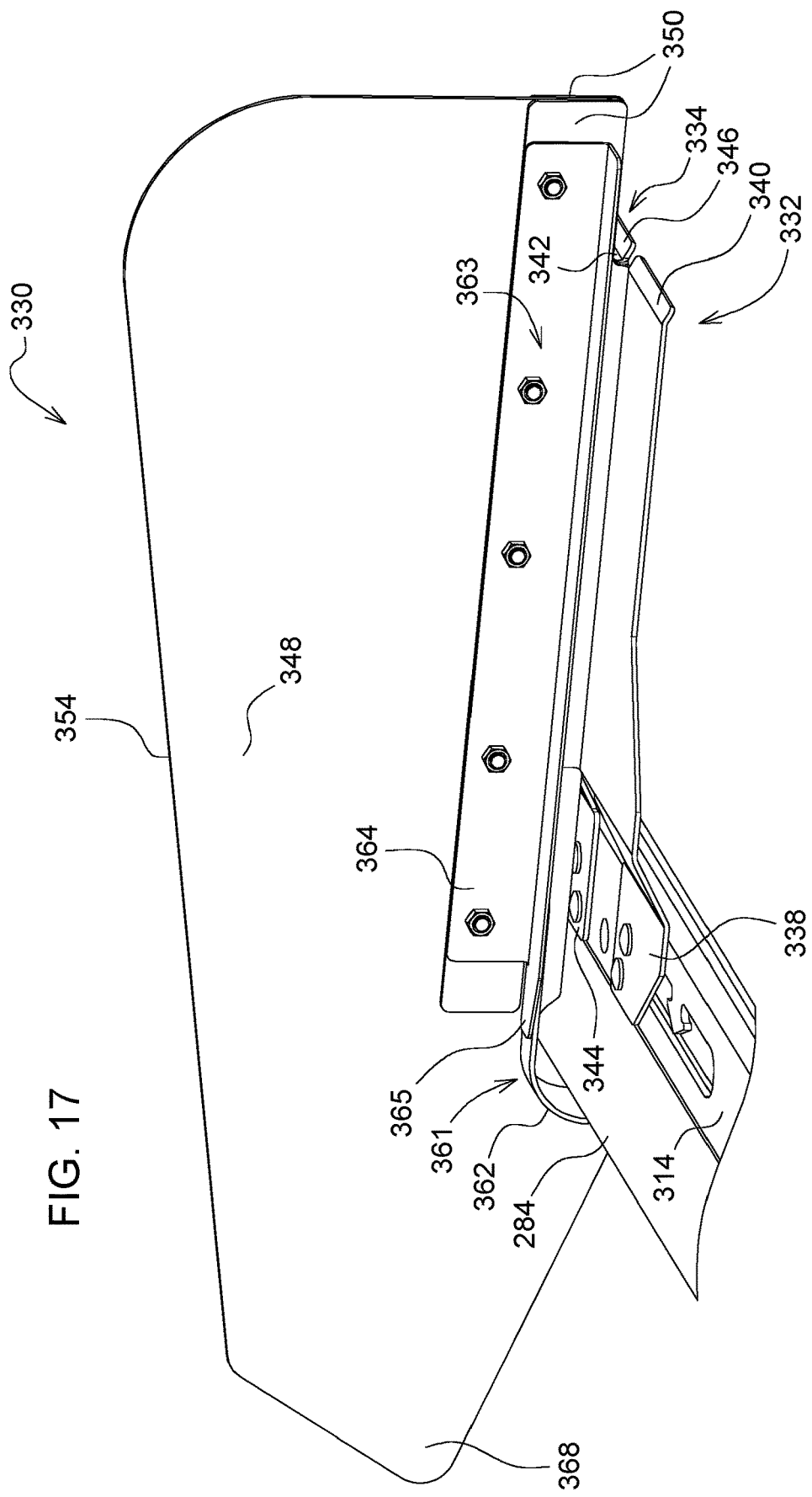
FIG. 17 is a perspective view showing mounting of the panel of the second embodiment to the bar of the belt tensioner with first and second mounting brackets.
Figure 18:
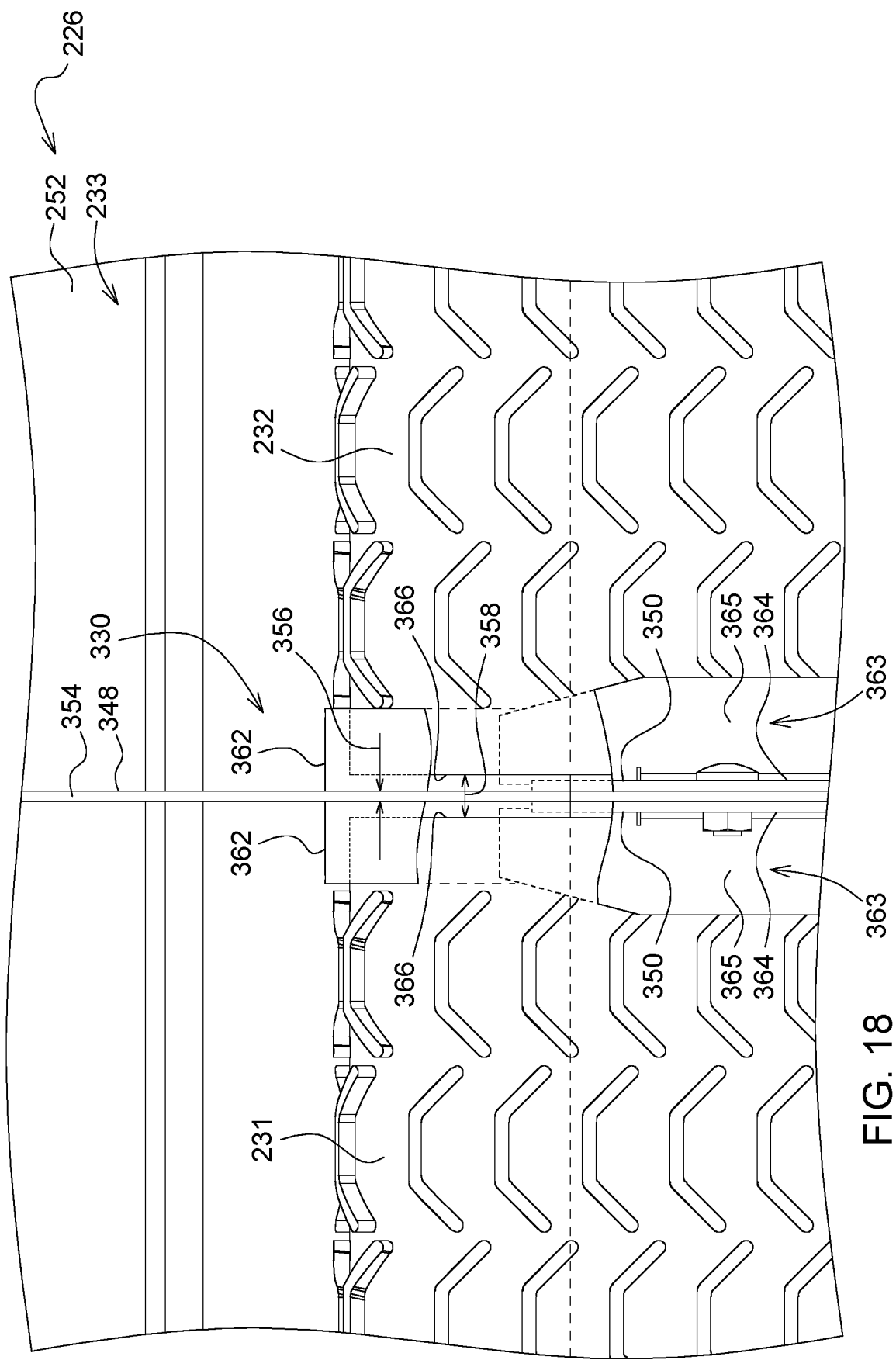
FIG. 18 is a top view showing the top margin of the crop divider of the second embodiment with a lateral thickness less than a lateral gap between the center draper belts.

Referring to FIGS. 12-13, the center section 226 includes a support structure 283 on which the first and second center draper belts 231, 232 are supported. The support structure 283 includes a front roller 284 and a rear roller 286. The rear roller 286 is coupled rotatably to the frame 233. The rear roller 286 is coupled rotatably to, and positioned laterally between, first and second fore-aft members 288 of the frame 233.

The first and second center draper belts 231, 232 are entrained about the front roller 286 and the rear roller 288. The rear roller 286 is driven in rotation by a motor to circulate the center draper belts 231, 232 in a feeding direction to move crop material toward the feederhouse 20 or in a reverse direction.

The support structure 283 includes a belt tensioner 310 that tensions the first and second center draper belts 231, 232. The belt tensioner 310 urges the front roller 284 forwardly away from the rear roller 286 to tension the belts 231, 232.

The belt tensioner 310 includes a tensioning assembly 312 and a bar 314 coupled to the tensioning assembly 312 and to the front roller 284. The bar 314, which may be referred to as a torsion bar, is yieldably biased forwardly away from the rear roller 286 by the tensioning assembly 312 to urge the front roller 284 forwardly.

The front roller 284 and the bar 314 are coupled to the frame 233 for fore-aft movement relative thereto. The front roller 284 and the bar 314 are coupled to the frame 233 via a first joint 316 and to the frame 233 via a second joint 316 (first joint 316 not shown). Each joint 316 includes a post 317 and a tubular structure 318 that receives the post 317 and is fixed to the frame 233. Opposite ends of the front roller 284 are rotatably coupled respectively to the posts 317, and opposite ends of the bar 314 are fixed respectively to the posts 317. Each post 317 is received in the tubular structure 318 of the respective joint 316 for fore-aft slidable movement relative thereto for fore-aft movement of the front roller 284 and the bar 314 relative to the frame 233.

The tensioning assembly 312 includes a post 322, a spring 324, a bell crank 326, and a link 328. The spring 324 surrounds the post 322. The bell crank 326 is pivotally coupled to the frame 233 to pivot about a pivot axis fixed relative to the frame 233. A first end of the bell crank 326 is coupled to the post 322 to be actuated thereby. The link 328 is pivotally coupled to a second end of the bell crank 326 and to the bar 314. The spring 324 yieldably biases the post 322 laterally to pivot the bell crank 326 about its fixed pivot axis to urge the link 328 toward the rod 314 to tension the center draper belts 231, 232.

Referring to FIGS. 13-18, the header 10 includes a crop divider 330. The crop divider 330 is positioned laterally between the first and second center draper belts 231, 232 to separate crop material fed laterally inwardly from the first and second side draper belts 228, 230 respectively to the first and second center draper belts 231, 232. Such separation promotes a relatively even feeding of crop material to the harvester 12, which is especially useful in the case of a harvester 12 with laterally adjacent, axially oriented threshing/separating rotors to prevent overloading or excessively uneven distribution of crop material to one rotor over against the other rotor, such as in a side-hill condition when one side section 222, 224 is uphill relative to the center second 226 and the other side section 222, 224 is downhill relative to the center second 326.

The crop divider 330 is mounted to the support structure 283. Illustratively, the crop divider 130 is mounted to the belt tensioner 310 for movement therewith relative to the frame 233. For example, the crop divider 130 is mounted to the bar 314 for movement therewith relative to the frame 233.

The crop divider 330 includes a first mounting bracket 332 and a second mounting bracket 334. The first and second mounting brackets 332, 334 are mirror images of one another, and are spaced laterally apart from one another. The mounting brackets 332, 334 The first and second mounting brackets 332, 334 are mounted to the support structure 383. The first and second mounting brackets 332, 334 are mounted to the bar 314 for movement therewith. A first flange 336 of the first mounting bracket 332 underlies the first center draper belt 231 and is coupled to the bar 314. The first flange 336 is supported on a plate 337 coupled to the frame 233. A first tab 338 of the first mounting bracket 332 extends downwardly from a front portion of the first flange 136 and is coupled (e.g., bolted) to an upper side of the bar 314 so as to be fixed thereto. A first lip 340 is declined from a rear portion of the first flange 336 to facilitate movement of the first center draper belt 231 over the first flange 336. A second flange 342 of the second mounting bracket 334 underlies the second center draper belt 232 and is coupled to the bar 314. The second flange 342 is supported on the plate 337. A second tab 344 of the second mounting bracket 336 extends downwardly from a front portion of the second flange 342 and is coupled (e.g., bolted) to an upper side of the bar 314 so as to be fixed thereto. A second lip 346 is declined from a rear portion of the second flange 342 to facilitate movement of the second center draper belt 232 over the second flange 342.

The crop divider 330 includes an upright panel 348 extending in a fore-aft dimension 277 of the header 10. The panel 348 rises vertically above the first and second center draper belts 231, 232, creating a barrier to block or otherwise inhibit flow of crop material from one lateral side of the panel 348 to the other.

The panel 348 is mounted to the first and second mounting brackets 332, 334. The brackets 332, 334 are coupled to the panel 348 (e.g., with bolts) and sandwich the panel 348 laterally therebetween. The mounting brackets 332, 334 are coupled to the panel 348 and the belt tensioner 310 for movement of the crop divider 330 with the belt tensioner 310 relative to the frame 233.

The first mounting bracket 332 includes an upright attachment body 350, and the second mounting bracket 334 includes an upright attachment body 350. The first and second upright attachment bodies 350, 350 extend vertically from the first and second flanges 336, 342, respectively. The first and second attachment bodies 350, 350 are coupled to the panel 348 (e.g., with bolts) and sandwich the panel 348 laterally therebetween.

The panel 348 defines a top margin 354 of the crop divider 330. The top margin 354 has a lateral thickness 356 less than a lateral gap 358 between the first and second center draper belts 231, 232. In some embodiments, at least a portion of the top margin 354 is at least as high as a bottom portion 360 of the feed drum 280.

The crop divider 330 includes shingling 361. The shingling 361 overlaps the first center draper belt 231 thereabove and the second center draper belt 232 thereabove. The panel 348 rises vertically above the first and second center draper belts 231, 232 and the shingling 361.

The shingling 361 includes a first shingle 362 and a second shingle 362. The first and second shingles 362 are mirror images of one another. The first and second shingles 362, 362 overlap respectively the first and second center draper belts 231, 232 to inhibit build-up of material between the panel 348 and each center draper belt 231, 232. The first shingle 362 overlaps the first center draper belt 231 in front of and above the first center draper belt 231. The first shingle 362 extends laterally outwardly from the panel 348 so as to overlap a laterally inner edge 366 of the first center draper belt 231. The second shingle 362 overlaps the second center draper belt 232 in front of and above the second center draper belt 232. The second shingle 362 extends laterally outwardly from the panel 348 so as to overlap a laterally inner edge 366 of the second center draper belt 232. The first and second shingles 362, 362 are positioned below the top margin 354. Each shingle 362 is configured, for example, as a wall projecting laterally from the panel 348.

The crop divider 330 includes a first angle bracket 363 and a second angle bracket 363. The first and second angle brackets 363, 363 are mirror images of one another. The first and second angle brackets 363, 363 are coupled to the panel 348 and the attachment bodies 350 (e.g., with bolts) and sandwich the panel 348 and the attachment bodies 350 laterally therebetween. The first and second angle brackets 363, 363 overlap respectively the first and second center draper belts 231, 232 to inhibit build-up of material between the panel 148 and each center draper belt 231, 232.

Each angle bracket 363 includes an attachment body 364 and a shingle 365. The attachment bodies 364 are coupled to the panel 348 and the attachment bodies 350 (e.g., with bolts) and sandwich the panel 348 and the attachment bodies 350 laterally therebetween. The shingle 365 of the first angle bracket 363 is included in the shingling 361, overlaps the first shingle 350 above the first shingle 350, and overlaps the first center draper belt 231. The shingle 365 of the first angle bracket 363 extends laterally outwardly from the attachment body 364 of the first angle bracket 363 so as to overlap the laterally inner edge 366 of the first center draper belt 231. The shingle 365 of the second angle bracket 363 is included in the shingling 361, overlaps the second shingle 362 above the second shingle 362, and overlaps the second center draper belt 232. The shingle 365 of the second angle bracket 363 extends laterally outwardly from the attachment body 364 of the second angle bracket 363 so as to overlap the laterally inner edge 366 of the second center draper belt 232. The first and second angle brackets 363 and their attachment bodies 364 and shingles 365 are positioned below the top margin 354.

The panel 348 includes a nose 368. The nose 368 extends forwardly of the first and second center draper belts 231, 232 over a front member 252 of the frame 233, promoting separation of the flow of crop material between the first and second center draper belts 231, 232.

The crop divider 330 may include a sheath (not shown), similar to sheath 170. In such a case, the panel 348 extends into the sheath for translation between the panel 348 and the sheath. The sheath is mounted to the front member 252 (e.g., bolted). The nose 368 of the panel 348 extends into the sheath for relative translation between the panel 348 and the sheath. Such translation can occur in the fore-aft dimension 277 and vertically. In its nominal position, the nose 368 is spaced laterally apart from the vertical side walls of the sheath to define a lateral gap therebetween. The panel 348 may deflect into contact with a respective side wall of the sheath in response to lateral loading by crop material, such that the sheath is configured to constrain lateral movement of the panel 348, including the nose 368 thereof.

The crop divider 330 may include a divider rod (not shown) and a rod mount (not shown), similar to the divider rod 172 and the rod mount 174. In such a case, the divider rod divides the crop material ahead of the panel 348. The divider rod is coupled to the sheath via the rod mount. The rod mount includes a bracket to which the rod is coupled (e.g., bolted), and an arm coupled (bolted) to the sheath and the bracket.

In some embodiments, the sheath may be omitted from the header 210. In such a case, the divider rod may be mounted to the frame 233 so as to be included in the header 210, or the divider rod and rod mount may also be omitted.

Each crop divider 130, 330, or variations thereof, may be used with a wide variety of other draper headers having first and second side draper belts and first and second center draper belts, with the crop divider 130, 330 positioned between the center draper belts. In some embodiments, the crop divider may be mounted to the frame supporting the first and second center draper belts instead of a torsion bar of a belt tensioner. For example, the first center draper belt may be entrained about a front roller and a rear roller, and the second center draper belt may be entrained about another front roller and another rear roller, each of the front rollers and the rear rollers rotatably coupled to a center portion of the frame. In such a case, the crop divider may be mounted to the center portion of the frame.

It is to be understood that hatching in the drawings is general in nature, rather than material-specific. Threads are not shown for ease of illustration. However, it is to be appreciated that bolts, studs, screws, nuts, and the like would have threads.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An agricultural header for use with an agricultural harvester, the agricultural header operable in a forward direction of travel to harvest crop material, the agricultural header comprising:
   a first side draper belt and a second side draper belt,
   a first center draper belt and a second center draper belt, the first and second center draper belts positioned laterally between the first and second side draper belts which extend laterally outwardly in opposite directions away from the first and second center draper belts, each of the first and second side draper belts arranged to feed crop material laterally inwardly, each of the first and second center draper belts arranged to feed crop material rearwardly for processing by the agricultural harvester, and
   a crop divider positioned laterally between the first and second center draper belts to separate crop material fed laterally inwardly from the first and second side draper belts respectively to the first and second center draper belts, the crop divider comprising shingling and an upright panel configured to block a flow of crop material between the first and second center draper belts, the shingling overlapping the first and second center draper belts thereabove, the upright panel extending in a fore-aft dimension of the agricultural header, the panel being vertically upright and rising vertically above the first and second center draper belts and the shingling.

2. The agricultural header of claim 1, comprising a feed drum and tines projecting from the feed drum, wherein at least a portion of a top margin of the crop divider is at least as high as a lower portion of the feed drum.

3. The agricultural header of claim 1, wherein the upright panel defines a top margin of the crop divider with a lateral thickness less than a lateral gap between the first and second center draper belts.

4. The agricultural header of claim 1, comprising a frame and a belt tensioner that tensions the first and second center draper belts, and the crop divider is mounted to the belt tensioner for movement therewith relative to the frame.

5. The agricultural header of claim 4, comprising a front roller and a rear roller coupled to the frame, the first and second center draper belts are entrained about the front roller and the rear roller, the belt tensioner comprises a bar coupled to the front roller and yieldably biased forwardly away from the rear roller to urge the front roller forwardly, and the crop divider is mounted to the bar for movement therewith.

6. An agricultural header for use with an agricultural harvester, the agricultural header operable in a forward direction of travel to harvest crop material, the agricultural header comprising:
   a first side draper belt and a second side draper belt,
   a first center draper belt and a second center draper belt, the first and second center draper belts positioned laterally between the first and second side draper belts which extend laterally outwardly in opposite directions away from the first and second center draper belts, each of the first and second side draper belts arranged to feed crop material laterally inwardly, each of the first and second center draper belts arranged to feed crop material rearwardly for processing by the agricultural harvester, and
   a crop divider positioned laterally between the first and second center draper belts to separate crop material fed laterally inwardly from the first and second side draper belts respectively to the first and second center draper belts, the crop divider comprising shingling and a panel, the shingling overlapping the first and second center draper belts thereabove, the panel extending in a fore-aft dimension of the agricultural header and rising vertically above the first and second center draper belts and the shingling,
   a frame and a belt tensioner that tensions the first and second center draper belts, and the crop divider is mounted to the belt tensioner for movement therewith relative to the frame
   a front roller and a rear roller coupled to the frame, the first and second center draper belts are entrained about the front roller and the rear roller, the belt tensioner comprises a bar coupled to the front roller and yieldably biased forwardly away from the rear roller to urge the front roller forwardly, and the crop divider is mounted to the bar for movement therewith, wherein the crop divider comprises a first mounting bracket and a second mounting bracket, the first and second mounting brackets are coupled to the panel and sandwich the panel laterally therebetween, the first mounting bracket comprises a first flange underlying the first center draper belt and coupled to the bar, and the second mounting bracket comprises a second flange underlying the second center draper belt and coupled to the bar.

7. The agricultural header of claim 6, wherein the first mounting bracket comprises a first lip declined from a rear portion of the first flange to facilitate movement of the first center draper belt over the first flange, and the second mounting bracket comprises a second lip declined from a rear portion of the second flange to facilitate movement of the second center draper belt over the second flange.

8. The agricultural header of claim 1, the crop divider comprises a first mounting bracket and a second mounting bracket, and the first and second mounting brackets are coupled to the upright panel and sandwich the upright panel laterally therebetween, the first mounting bracket comprises a first flange underlying the first center draper belt, and the second mounting bracket comprises a second flange underlying the second center draper belt.

9. The agricultural header of claim 1, comprising a belt tensioner that tensions at least one of the first and second center draper belts, and the crop divider is mounted to the belt tensioner.

10. The agricultural header of claim 9, comprising a frame, wherein the crop divider comprises a mounting bracket coupled to the upright panel and the belt tensioner for movement of the crop divider with the belt tensioner relative to the frame.

11. The agricultural header of claim 10, comprising a front roller and a rear roller, at least one of the first and second center draper belts is entrained about the front roller and the rear roller, the belt tensioner comprises a bar coupled to the front roller and yieldably biased forwardly away from the rear roller to urge the front roller forwardly, and the mounting bracket is mounted to the bar for movement therewith.

12. The agricultural header of claim 8, wherein the first mounting bracket comprises a first lip declined from a rear portion of the first flange to facilitate movement of the first center draper belt over the first flange, and the second mounting bracket comprises a second lip declined from a rear portion of the second flange to facilitate movement of the second center draper belt over the second flange.

13. The agricultural header of claim 1, wherein the shingling comprises a first shingle overlapping the first center draper belt in front of and above the first center draper belt and a second shingle overlapping the second center draper belt in front of and above the second center draper belt, and the first and second shingles are positioned below a top margin of the crop divider.

14. The agricultural header of claim 13, wherein the first shingle extends laterally from the upright panel so as to overlap a laterally inner edge of the first center draper belt, and the second shingle extends laterally from the upright panel so as to overlap a laterally inner edge of the second center draper belt.

15. The agricultural header of claim 1, wherein the upright panel comprises a nose extending forwardly of the first and second center draper belts.

16. The agricultural header of claim 15, wherein the crop divider comprises a sheath into which the nose extends.

17. An agricultural header for use with an agricultural harvester, the agricultural header comprising:
a first side draper belt and a second side draper belt each arranged to feed crop material laterally inwardly;
a first center draper belt and a second center draper belt positioned laterally between the first and second side draper belts, each of the first and second center draper belts arranged to feed crop material rearwardly for processing by the agricultural harvester, and
a crop divider positioned laterally between the first and second center draper belts, the crop divider comprising a first mounting bracket, a second mounting bracket, shingling, and an upright panel configured to block a flow of crop material between the first and second center draper belts, the shingling overlapping the first and second center draper belts thereabove, the panel being coupled to, and positioned between, the first and second mounting brackets, the panel extending in a fore-aft dimension of the agricultural header, the panel being vertically upright and rising vertically above the first and second center draper belts and the shingling, a first flange of the first mounting bracket underlying the first center draper belt, a rear portion the first flange extending downwardly to facilitate a downward movement of the first center draper belt around the rear portion of the first flange, a second flange of the second mounting bracket underlying the second center draper belt, a rear portion of the second flange extending downwardly to facilitate a downward movement of the second center draper belt around the rear portion of the second flange.

18. The agricultural header of claim 17, wherein the upright panel provides a barrier that blocks a flow of crop material from a first lateral side of the upright panel to a second lateral side of the upright panel.

19. The agricultural header of claim 17, wherein the upright panel extends forward laterally of the first and second center draper belts to a location that promotes a separation of a flow of crop material between the first and second center draper belts.

20. The agricultural header of claim 17, wherein the rear portion of the first mounting bracket comprises a first lip declined from the rear portion of the first flange to facilitate movement of the first center draper belt over the first flange, and the rear portion of the second mounting bracket comprises a second lip declined from the rear portion of the second flange to facilitate movement of the second center draper belt over the second flange.

* * * * *